(12) United States Patent
Ohtani et al.

(10) Patent No.: US 6,313,481 B1
(45) Date of Patent: Nov. 6, 2001

(54) SEMICONDUCTOR DEVICE AND A METHOD OF MANUFACTURING THE SAME

(75) Inventors: Hisashi Ohtani; Misako Nakazawa, both of Kanagawa (JP)

(73) Assignees: Semiconductor Energy Laboratory Co., Ltd., Kanagawa-ken; Sharp Kabushiki Kaisha, Osaka, both of (JP)

( * ) Notice: Subject to any disclaimer, the term of this patent is extended or adjusted under 35 U.S.C. 154(b) by 0 days.

(21) Appl. No.: 09/356,377

(22) Filed: Jul. 19, 1999

(30) Foreign Application Priority Data

Aug. 6, 1998 (JP) .................. 10-234961
Sep. 8, 1998 (JP) .................. 10-254097
Jun. 8, 1999 (JP) .................. 11-160460

(51) Int. Cl.$^7$ .......... H01L 29/04; H01L 31/036; H01L 31/0376
(52) U.S. Cl. .............. 257/59; 257/72; 257/376
(58) Field of Search ............... 257/59, 72, 376

(56) References Cited

U.S. PATENT DOCUMENTS

| | | |
|---|---|---|
| 4,639,087 | 1/1987 | Cannella . |
| 4,728,175 | 3/1988 | Barou . |
| 4,759,610 | 7/1988 | Yanagisawa . |
| 4,899,203 | * 2/1990 | Ino . |
| 5,056,895 | 10/1991 | Kahn . |
| 5,182,620 | 1/1993 | Shimada et al. . |
| 5,182,661 | 1/1993 | Ikeda et al. . |
| 5,193,017 | 3/1993 | Iwai et al. . |
| 5,317,432 | 5/1994 | Ino . |
| 5,594,569 | 1/1997 | Konuma et al. . |
| 5,648,277 | 7/1997 | Zhang et al. . |
| 5,668,613 | 9/1997 | Kim et al. . |
| 5,686,976 | 11/1997 | Nishikawa . |
| 5,745,195 | 4/1998 | Zhang . |
| 5,747,830 | * 5/1998 | Okita . |
| 5,767,827 | 6/1998 | Kobayashi et al. . |
| 5,777,702 | 7/1998 | Wakagi et al. . |
| 5,834,328 | * 11/1998 | Jang . |
| 5,982,460 | 11/1999 | Zhang et al. . |
| 6,078,365 | 6/2000 | Ueda et al. . |

FOREIGN PATENT DOCUMENTS

| | | |
|---|---|---|
| 56-017381 | 2/1981 | (JP) . |
| 58-159518 | 9/1983 | (JP) . |
| 01-140129 | 6/1989 | (JP) . |
| 03-009328 | 1/1991 | (JP) . |
| 04-086809 | 3/1992 | (JP) . |
| 06-258669 | 9/1994 | (JP) . |
| 07-092491 | 4/1995 | (JP) . |
| 7-135318 | 5/1995 | (JP) . |
| 8-43854 | 2/1996 | (JP) . |
| 8-306926 | 11/1996 | (JP) . |
| 2759415 | 3/1998 | (JP) . |

OTHER PUBLICATIONS

"Characteristics and Driving Scheme of Polymer–Stabilized Monostable FLCD Exhibiting Fast Response Time and High Contrast Ratio with Gray–Scale Capability", H. Furue et al., SID, 1998.
"A Full–Color Thresholdless Antiferroelectric LCD Exhibiting Wide Viewing Angle with Fast Response Time", T. Yoshida et al., SID DIGEST, pp. 841–844, 1997.
"Thresholdless antiferroelectricity in liquid crystals and its application to displays", Inui et al., J. Mater. Chem., 6(4), pp. 671–673, 1996.

* cited by examiner

Primary Examiner—Stephen D. Meier
(74) Attorney, Agent, or Firm—Eric J. Robinson; Nixon Peabody LLP

(57) ABSTRACT

In a liquid crystal display device, an improved storage capacitance that uses a pair of transparent conductive films for electrodes is provided. On a flattening film made of a resin, a first transparent conductive film and an insulating film for capacitance are formed into a lamination to form in this laminated film an opening portion. An insulating film covering near the opening portion is formed. A transparent conductive film is formed and patterned to form a pixel electrode. Thus is formed a storage capacitance having the structure where the insulating film for capacitance is sandwiched between the first transparent conductive film and the pixel electrode.

10 Claims, 15 Drawing Sheets

Cs FORMING REGION

SEMICONDUCTOR DEVICE AND A METHOD OF MANUFACTURING THE SAME

BACKGROUND OF THE INVENTION

1. Field of the Invention

The present invention relates to an electro-optical device represented by a liquid crystal display device, and to the structure of an electronic apparatus provided with as a part such an electro-optical device. Incidentally, the term "semiconductor device" in this specification designates devices in general which can function with the use of characteristics of semiconductor, and therefore the above-described electro-optical device and electronic apparatus fall into the semiconductor devices.

2. Description of the Related Art

In recent years, what has received attention is an active matrix type liquid crystal display device in which a circuit is consisted of a thin film transistor (hereinafter, referred to as TFT) utilizing a polysilicon film. This is a device intended for realization of image display with high definition by, using a plurality of pixel TFTs that are arranged in matrix, controlling on matrix basis the electric field that applies on the liquid crystal.

In such an active matrix type liquid crystal display device, a capacitance (condenser, or capacitor) is comprised of a pixel electrode formed for every pixel and an opposite electrode formed on the side opposite thereto through the liquid crystal placed in between. However, the capacitance having those alone is not large enough and hence is ordinarily supplemented with a storage capacitance (also called as Cs) formed separately from the former.

There are various structures for the storage capacitance (Cs structure), among which presented (in Japanese Patent Application Laid-open Nos. Hei 8-43854 and 8-306926) is the structure where an insulating film is, taking into consideration the aperture ratio in a transmission type liquid crystal display device, sandwiched between two layers of transparent conductive films.

Each of the above publications claims that with its Cs structure, a large capacitance can be ensured without degrading the aperture ratio through employment of a transparent conductive film, such as ITO, for both of two electrodes that form a pair and constitute the storage capacitance. The conventional structure is shown in FIG. 2.

In FIG. 2, reference numeral 201 denotes a capacitance electrode formed of the transparent conductive film. An interlayer insulating film 202 is formed thereon which serves also as a dielectric material of the storage capacitance, and a pixel electrode 203 is further formed.

However, such a structure may have a problem of poor coverage of the interlayer insulating film 202 at an end portion 204 (the area circled with a dotted line) of the storage capacitance. That is, though thinness is preferable as the dielectric material to enlarge the capacitance, it causes a problem of the short circuit between the capacitance electrode 201 and the pixel electrode 203. For that reason, there is a relationship of trade-off between the thickness of the dielectric material and enlargement of the capacitance, where a certain degree of film thickness is required in order to carry out the function as the interlayer insulating film.

For instance, the film thickness of the capacitance electrode 201 is required to be about 100 to 200 nm because of the transparent conductive film having a resistance higher than that of a metal film and in view of the electric potential distribution. To completely cover the capacitance electrode 201, it therefore is necessary for the interlayer insulating film to have a film thickness of at least 200 nm or more. However, the volume of the capacitance is in inverse proportion to the film thickness of the dielectric material, and to thicken the film thickness thereof is not desirable when aiming at securement of a large capacitance.

As described above, many problems are still remained unresolved under the existing circumstances though sandwiching the interlayer insulating film between a pair of transparent conductive films makes it possible to enlarge, without degrading the aperture ratio, an area where the storage capacitance may be formed.

SUMMARY OF THE INVENTION

The present invention is a technology developed to solve the above-described problems, and therefore an object of the present invention is to further improve an electrooptical device with a storage capacitance that uses a pair of transparent conductive films, and then to provide a semiconductor device of higher quality.

According to an aspect of the present invention disclosed in this specification, there is provided a semiconductor device that has a plurality of pixel TFTs arranged in matrix and a storage capacitance connected to each of the plurality of pixel TFTs, comprising:

a first transparent conductive film having a first opening portion;

an insulating film for capacitance, covering the first transparent conductive film and having a second opening portion that reaches the inside deeper than the first opening portion;

an interlayer insulating film covering the second opening portion and formed into a pattern above the pixel TFTs; and a second transparent conductive film formed in contact with the interlayer insulating film and the insulating film for capacitance, and wherein the storage capacitance has the structure in which the first transparent conductive film, the insulating film for capacitance and the second transparent conductive film are laminated.

According to another aspect of the present invention, there is provided a semiconductor device that has a plurality of pixel TFTs arranged in matrix and a storage capacitance connected to each of the plurality of pixel TFTs, comprising:

a first transparent conductive film having a first opening portion;

an insulating film for capacitance, covering the first transparent conductive film and having a second opening portion that reaches the inside deeper than the first opening portion;

an interlayer insulating film covering the second opening portion and formed into a pattern above the pixel TFTs; and a second transparent conductive film formed in contact with the interlayer insulating film and the insulating film for capacitance, wherein the storage capacitance has the structure in which the first transparent conductive film, the insulating film for capacitance and the second transparent conductive film are laminated, and wherein the first transparent conductive film is grounded through a pad electrode formed of the second transparent conductive film.

In the above-described aspects, the interlayer insulating film is preferably made of a resin material. An example of such a resin material includes polyimide, acryl, polyamide, polyimideamide and BCB (benzocyclobutene). It is also preferable to form the interlayer insulating film with a resin material having light shielding property (such as a resin material with dispersed black pigment or metal element), or with a resin material having light shielding property and a transparent resin material which are laminated.

PREFERRED EMBODIMENT OF THE PRESENT INVENTION

The present invention with the aforementioned structures will be described in detail below.

An embodiment of a liquid crystal display device utilizing the present invention will be described with reference to FIG. 1. Shown in FIG. 1 is a sectional view illustrating a plurality of pixels arranged in matrix and a storage capacitance provided for every pixel.

Figure 1:
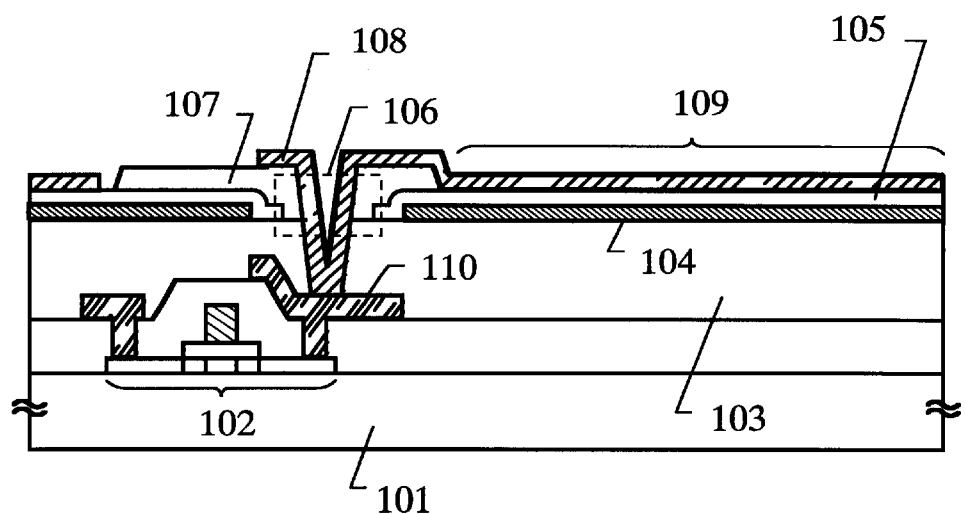
FIG. 1 is a sectional view showing the structure of a pixel and a storage capacitance of the present invention.
Figure 2:
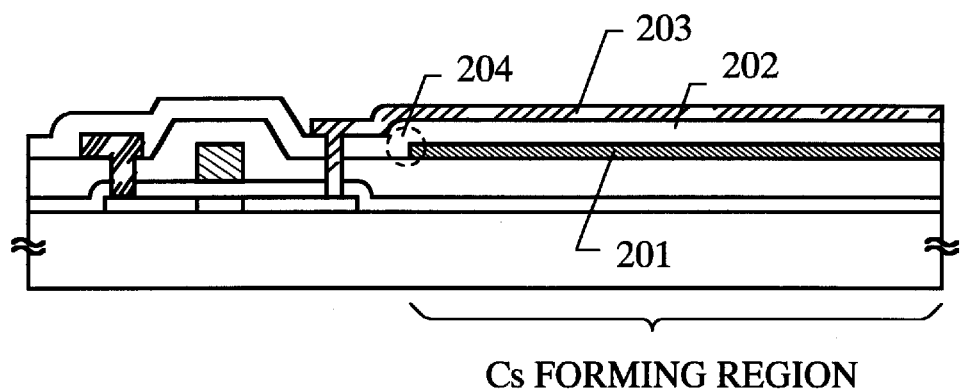
FIG. 2 is a sectional view showing the structure of a conventional pixel and storage capacitance.

In FIG. 1, reference numeral 101 denotes a substrate having an insulating surface, and a pixel TFT 102 is formed thereon by a known measure. A flattening film (a first interlayer insulating film) 103 is formed so as to cover this pixel TFT 102. The flattening film 103 may utilize any kind of insulating film, but preferably uses a resin material such as polyimide, acryl or BCB (benzocyclobutene) to realize high flatness.

On the flattening film 103, a first transparent conductive film 104 is firstly formed, an opening portion (a first opening portion) is formed above a drain electrode 110 and thereafter, an insulating film 105 for capacitance is formed. As the first transparent conductive film 104, tin oxide, ITO (indium tin oxide) or the like is sufficiently used. This first transparent conductive film 104 functions as a lower electrode of the storage capacitance.

A transparent insulating film of, for example, silicon oxide, silicon nitride, silicon oxide nitride, tantalum oxide or aluminum oxide (alumina) is used as the insulating film 105 for capacitance. This insulating film 105 for capacitance functions as a dielectric material of the storage capacitance to be formed throughout the whole area within the pixel, and therefore is preferably formed of an insulating film with high transmittance.

In the present invention, as a large area for the storage capacitance can be ensured and the film thickness of the dielectric material simultaneously is possible to be formed thinner (which will be described later), the insulating film does not need to have so high a relative permittivity. Accordingly, enhancement of the transmittance may be given a first priority at the selection of the optimum insulating film, so that bright image display is obtained.

An opening portion (a second opening portion) 106 is formed in the insulating film 105 for capacitance. This is an opening portion for saving a connection portion (referred to as a drain connection portion) to connect a pixel electrode and the drain electrode 110 in a later step. The opening portion 106 is formed at the inside deeper than the opening portion (the first opening portion) that is provided in the first transparent conductive film 104.

Then, an insulating film 107 having a low relative permittivity is formed so as to cover the opening portion 106 and is patterned. In the patterning step, the insulating film 107 is selectively removed restricting to parts formed on a portion where the storage capacitance is to be formed and on the drain connection portion so that a contact hole is formed in the drain connection portion (the opening portion 106) and, simultaneously, the insulating film 105 for capacitance is exposed. That is, the insulating film 107 is formed into a pattern above the pixel TFT 102.

It is preferable to use a resin material for this interlayer insulating film 107. An example of the resin material includes polyimide, acryl, polyamide, polyimideamide and BCB (benzocyclobutene). Needless to say, other than the resin material, may be used alone an insulating film containing silicon (silicon oxide, silicon nitride, etc.), or may be used by laminating an insulating film containing silicon and a resin material.

A second transparent conductive film is formed thereon and is patterned to form a pixel electrode 108. This pixel electrode 108 is brought into contact with the insulating film 105 for capacitance within the pixel to form a storage capacitance 109 that is comprised of the first transparent conductive film/insulating film for capacitance/second transparent conductive film.

The pixel electrode 108 is electrically connected with the drain electrode 110 of the TFT 102, and the voltage applied to the pixel electrode 108 is controlled at the TFT 102. Incidentally, although FIG. 1 shows the structure in which the pixel electrode 108 is connected with the drain electrode 110, an alternative structure where the pixel electrode 108 is connected directly to an active layer of the TFT 102 may be employed.

In the structure shown in FIG. 1, the TFT 102 is completely shielded against light by a black mask provided on the opposite substrate side of the liquid crystal display device. This is meant for preventing the active layer of the TFT 102 from being irradiated with light. It is of course possible to employ the structure in which a light-shielding layer is formed between the substrate 101 and the TFT 102.

A feature of the present invention having the above-described structure resides in the point that the film thickness of the insulating film 105 for capacitance (the dielectric material of the storage capacitance) is freely adjustable. The structure of the present invention is in contrast to the structure mentioned in the conventional example in which a film thickness of 200 nm or more is required in view of the coverage, and is possible to form the film 105 in a film thickness of about 10 to 200 nm (preferably 50 to 100 nm) owing to the insulating film 107 that completely insulates and separates the first transparent conductive film 104 from the pixel electrode 108. In other words, the film thickness of the insulating film 105 for capacitance may be thinner than that of the first transparent conductive film 104.

The lower limit of the film thickness is set to 10 nm since the thickness thinner than this is weak in terms of withstand voltage and liable to cause dielectric breakdown. Also, another reason for this includes the fact that a film thinner than 10 nm is difficult to ensure a uniform film thickness. In the light of those reasons, a preferable film thickness would be about 50 to 100 nm.

The insulating film 105 for capacitance basically does not have the upper limit in film thickness. With too thick a film, however, ensuring a large capacitance is difficult and moreover, the throughput is lowered, so that the film thickness has to be held down to a certain degree. In that context, the present inventors considers the upper limit of the film thickness to be 200 nm (preferably 100 nm).

In this way, to be free to set the film thickness of the dielectric material of the storage capacitance is a very significant advantage. As generally known, there exists a condition (reflection prevention condition) for increasing the transmittance when thin films having refractive index different from one another are formed into a lamination. This relationship is expressed by an equation of $nd=\lambda/4$, when the refractive index is given as n; the film thickness, d; and the wavelength of the transmitted light, $\lambda$.

In the present invention, optionality for the raw material and the film thickness of the dielectric material that forms the storage capacitance extends over so wide range that the term nd in the equation above is readily adjusted. Accordingly, the film thickness of each laminated film is controlled so as to satisfy the reflection prevention condition to realize a high transmittance, thereby forming a pixel region that, on one hand, functions as the storage capacitance and is capable of displaying an image brightly on the other hand.

The present invention of the above structure will be described in further detail with embodiments shown below.

[Embodiment 1]

In this embodiment, a process example of manufacturing an active matrix type liquid crystal display device is described with reference to FIGS. 3A to 3D, 4A to 4D, 6, 15A to 15C and 16. It is needless to say that though the description in this embodiment is made focusing on one pixel in a pixel matrix circuit, a driver circuit and a signal processing circuit can also integrally formed on the same substrate.

Firstly, a glass substrate provided with on its surface a base film made of silicon oxide is prepared as a substrate 301 having an insulating surface. Other than a glass substrate, may of course be used a quartz substrate (not necessarily provided with a base film), a ceramic glass substrate or a silicon wafer on which a thermal oxide film is formed. If the heat resistance and the process temperature are balanced, a plastic substrate may also be used.

The structure also effective is such that a heat radiating layer such as a metal film or aluminum nitride film is provided between the substrate and the base film.

A TFT is next formed on the substrate 301. The present invention does not depend on the "TFT structure", which allows the TFT to be formed by every known method. The description in this embodiment therefore will only give an outline thereof.

First, an active layer 302 made of a semiconductor thin film is formed on the substrate 301. For the semiconductor thin film, any raw material may be used: for example, an amorphous silicon thin film, polycrystalline (or microcrystalline) silicon thin film, single crystal silicon thin film, or silicon germanium thin film. Any known measure may be used as to the crystallizing technology to change an amorphous silicon thin film into a polycrystalline silicon thin film.

Next, a silicon oxide film with a thickness of 100 nm is formed as a gate insulating film 303 to form thereon a gate wiring 304. In this embodiment, the structure in which titanium is layered over tantalum is employed as the gate wiring 304. The use of other raw material may be possible.

In this specification, a portion in the gate wiring, which overlaps with the active layer is particularly called a gate electrode. Also, a portion in a source wiring, which overlaps with the active layer is particularly called a source electrode.

Figure 3A:
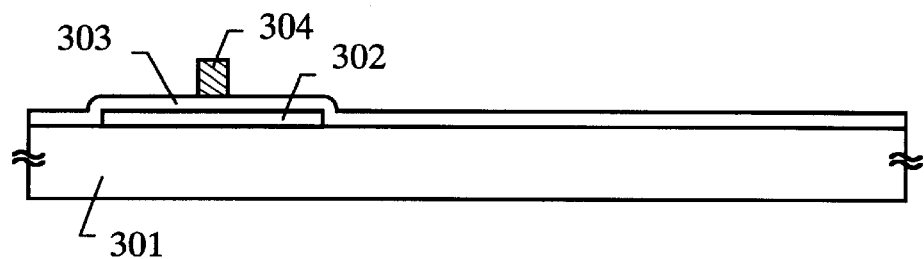
FIGS. 3A to 3D are views showing manufacturing steps of a pixel structure of Embodiment 1.
Figure 3B:
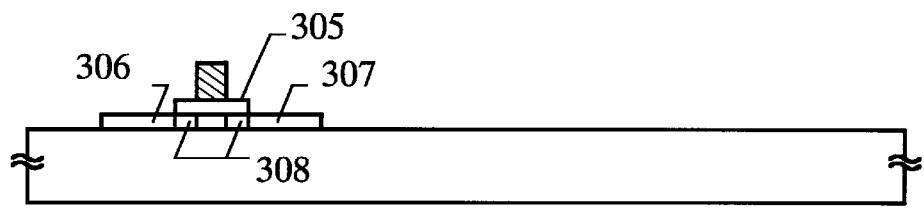

A state shown in FIG. 3A is thus obtained. The gate insulating film 303 is next etched, using the gate wiring 304 as a mask, into a new shape to form a gate insulating film 305. Then, using as a mask the gate wiring 304 and the gate insulating film 305, impurity ions that give one conductivity in a self-alignment manner are added into the active layer 302. (FIG. 3B) The step shown in FIG. 3B uses the technology disclosed in Japanese Patent Application Laid-open No. Hei 7-135318 filed by the present applicant, which is herein incorporated by reference. That is, the step of adding impurity ions are divided into two steps of adding under low acceleration voltage and adding under high acceleration voltage to form a source region 306, a drain region 307 and LDD regions 308. After the impurity ions are added, activation is carried out through laser annealing, furnace annealing or the like.

An interlayer insulating film 309 is next formed by about 1 $\mu$m. In this embodiment, the film 309 has a lamination structure in which a silicon nitride film with a thickness of 25 mm is first formed and an acrylic resin film of 900 nm in thickness is formed thereon.

Figure 3C:
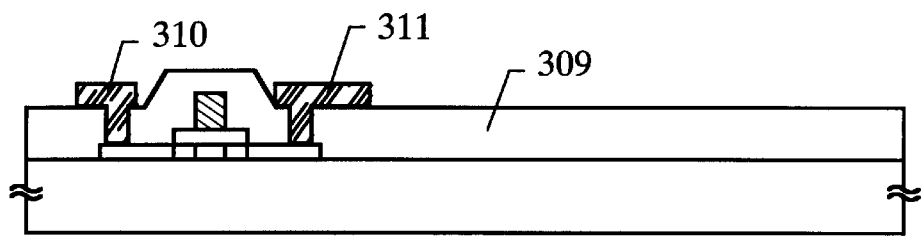

Next, a contact hole is formed in the interlayer insulating film 309, and a metal layer having three-layer structure of titanium/aluminum/titanium is formed and patterned to form a source wiring 310 and a drain electrode 311. A pixel TFT as shown in FIG. 3C is thus completed.

Figure 3D:
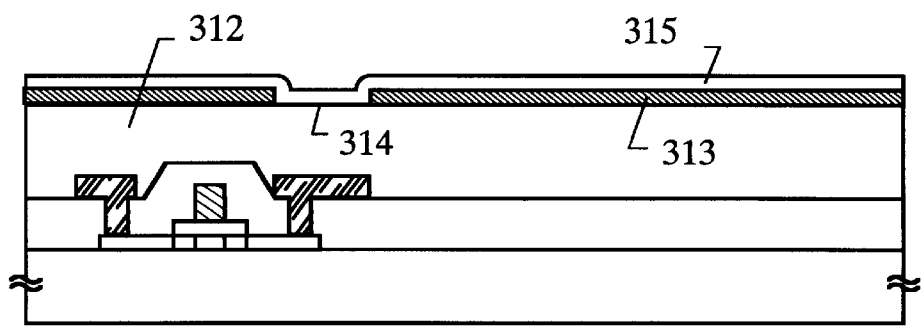

A flattening film 312 is then formed so as to cover the pixel TFT. Though used as the flattening film 312 in this embodiment is an acrylic resin, other resin material may be used. On the flattening film 312, a first transparent conductive film 313 is formed and patterned to provide a first opening portion 314 above the drain electrode 311. Further thereon, an insulating film 315 for capacitance is formed. (FIG. 3D)

An ITO (indium tin oxide) film formed by the sputtering method and having a thickness of 100 nm is used for the first transparent conductive film 313. In this embodiment, the film formation pressure is set to $3 \times 10^{-3}$ torr using as a target the ITO, and as sputtering gas the mixed gas of argon and oxygen. The film formation is performed with DC current control of 1.5 A and the substrate temperature is adjusted to be a room temperature.

When a resin material is used for the base film (flattening film) as in this embodiment, a process requiring to heat the substrate is not suitable because of a problem of degasification from the resin material. From that point, the sputtering method with which the film formation is allowed to be performed at a room temperature is a suitable measure.

As the insulating film 315 for capacitance, a silicon oxide film is used which is formed by the sputtering method and has a thickness of 50 nm. An advantage of the present invention is that, at this time, the film thickness of the insulating film 315 for capacitance can be thinner than that of the first transparent conductive film 313.

In this embodiment, the film formation pressure is set to $3 \times 10^{-3}$ torr using as a target $SiO_2$, and as sputtering gas the mixed gas of argon (30 sccm) and oxygen (10 sccm). The film formation is performed with RF power source control of 2000 W and the substrate temperature is adjusted to be a room temperature.

In this case, such a problem arises that, with a high substrate temperature, film quality of the first transparent conductive film 313 made of ITO becomes crystalline to make it hard to be etched.

According to knowledge of the present applicant, etching of the ITO film has been found to become difficult when the film formation temperature of the insulating film 315 for capacitance is 180° C. or more. On the other hand, the substrate temperature lowered too much causes degradation in film quality of the insulating film 315 for capacitance made of a silicon oxide film. That is, adverse effects such as lowering of withstand voltage would take place.

The experimental results has proved that a film needs to be formed within a temperature range of less than 180° C., preferably (100 to 150° C., more preferably), and to fulfill that requirement, it can be said that the sputtering method is the most preferable film formation method.

In this embodiment, a silicon oxide film is used as the insulating film 315 for capacitance but a transparent insulating film other than that may be used. As the relative permittivity becomes higher, an enough capacitance can be more securely obtained even with an increased film thickness, so that the occurrence rate of a defective product caused by short circuit can be further lowered. It is needless to say that the thickness should have the upper limitation of 200 nm since the throughput is lowered also with too thick a film thickness as mentioned above.

Figure 4A:
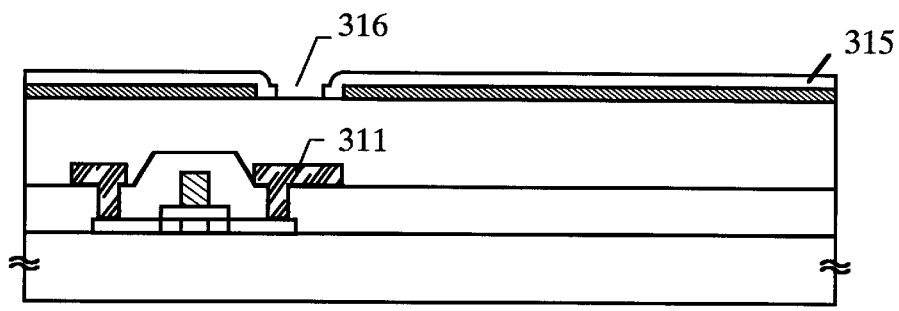
FIGS. 4A to 4D are views showing manufacturing steps of a pixel structure of Embodiment 1.

After the state shown in FIG. 3D is obtained in this way, a second opening portion 316 is formed at a position that is meant for a contact hole to be formed later for electrically connecting the drain electrode 311 and a pixel electrode (not shown). This second opening portion 316 has a diameter smaller than that of the first opening portion 314, and is formed inside the first opening portion 314. In addition, the second opening portion preferably has a satisfactory larger diameter than that of the contact hole to be formed later. Thus, short circuit between the first transparent conductive film 313 and the pixel electrode (not shown) can be prevented. (FIG. 4A)

In this embodiment, the second opening portion 316 is formed with a diameter determined by, making allowances for the margin, adding 3 μm to the diameter value of the contact hole to be formed later. When the contact hole has a radius of r μm, sufficient radius of the second opening portion will be (r+3) μm. The contact hole and the second opening portion 316 are of course formed concentrically.

Figure 4B:
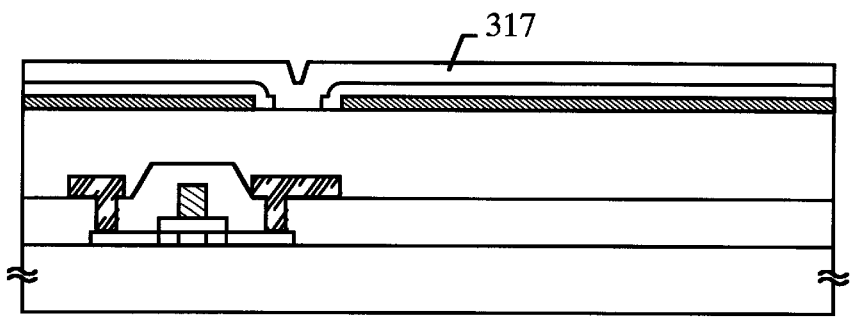
Figure 4C:
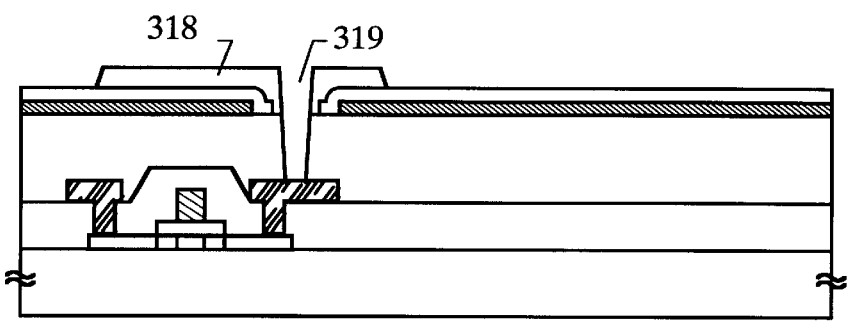

Next, an interlayer insulating film (second interlayer insulating film) 317 is formed to cover the insulating film 315 for capacitance and the second opening portion 316. Although an acrylic resin having a relative permittivity of 3.2 is used for the interlayer insulating film 317, it is preferable to use a raw material having a relative permittivity of 4.0 or less (preferably 3.5 or less), which includes representatively a resin material such as polyimide, polyamide, benzocyclobutene. When taking further the flatness into consideration, it is desirable to use benzocyclobutene. (FIG. 4B)

Upon completion of forming the interlayer insulating film 317, the film is patterned to remove a part of the interlayer insulating film 317, which is formed on a portion where a storage capacitance is to be formed later. The portion where a storage capacitance is to be formed substantially coincides with an image display region (a pixel region). As a result, an interlayer insulating film 318 is formed in a pattern above the pixel TFT.

In this state, the above-described second opening portion 316 is covered with the interlayer insulating film 318 formed in a pattern, which prevents occurrence of short circuit between the pixel electrode (not shown) and an end face of the first transparent conductive film 313.

Simultaneously with the formation in a pattern of the interlayer insulating film, a contact hole 319 for connecting the pixel electrode (not shown) and the drain electrode 311 is formed on a region where the second opening portion 316 is formed. (FIG. 4C) In this step, a resist mask (not shown) is first formed at a predetermined position of the interlayer insulating film 317, and the film is etched to form in a pattern the interlayer insulating film 318. Then, utilizing the resist mask as it is, a flattening film 312 is formed through etching. If, at this time, a condition for forming a tapered portion on a side wall of the contact hole is fulfilled, stepped cut of the pixel electrode may be prevented.

Figure 4D:
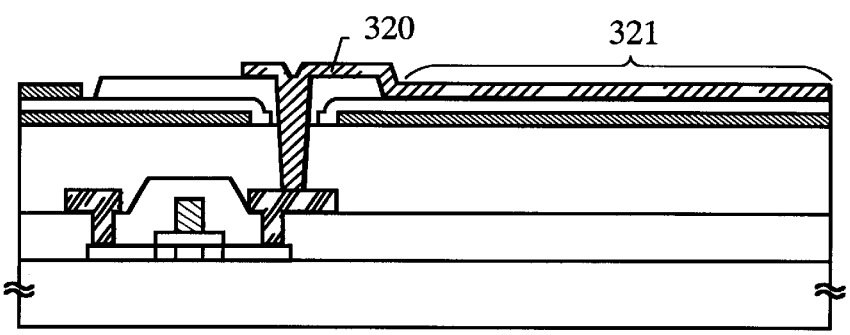

An ITO film with a thickness of 120 nm is then formed as the second transparent conductive film, and is patterned to form a pixel electrode 320. At a portion where this pixel electrode 320 comes in contact with the insulating film 315 for capacitance, a storage capacitance 321 is formed with the insulating film 315 for capacitance sandwiched between two layers of transparent conductive films (the first transparent conductive film and the second transparent conductive film) (FIG. 4D).

In the pixel structure having the structure above, there is an advantage that the region to be the storage capacitance occupies almost the whole area within the pixel, ensuring an area substantially as large as the image display region.

Figure 15A:
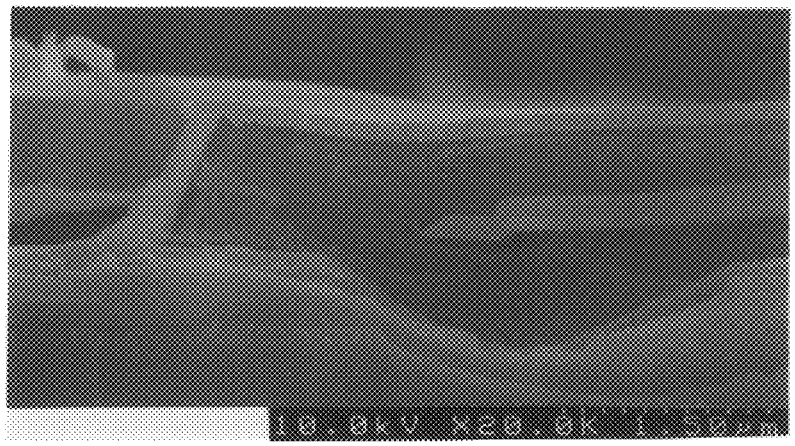
FIGS. 15A and 15B are photographs of TEM observation and FIG. 15C is a schematic diagram thereof of Embodiment 1.
Figure 15B:
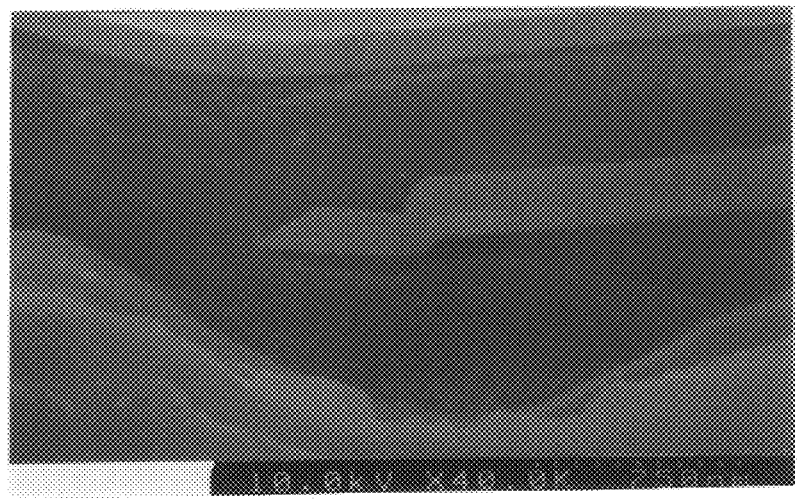
Figure 15C:
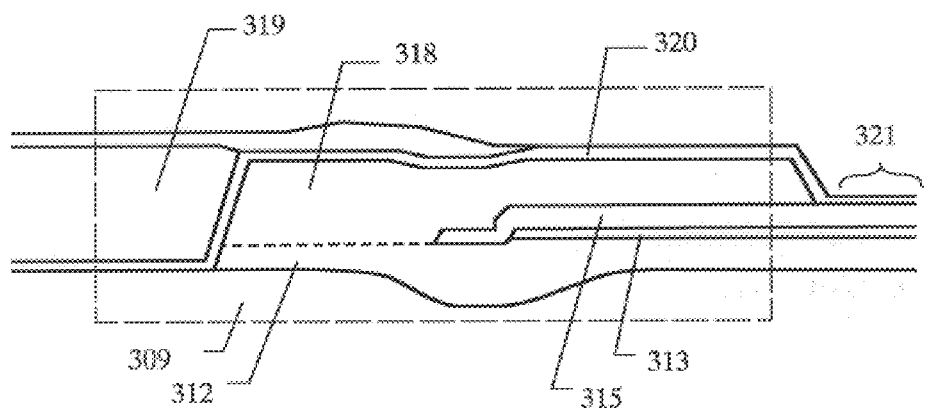

Characteristic points in the structure of the present invention are concretely shown in FIGS. 15A to 15C. FIG. 15A is a photograph of TEM observation showing a peripheral portion of the contact hole. FIG. 15B is a photograph of TEM observation showing an enlarged end portion of the first transparent conductive film in FIG. 15A, and FIG. 15C is a schematic view of FIG. 15A. Incidentally in FIGS. 15A to 15C, a hollow spot is observed in the interlayer insulating film 309, which is formed when a sample is taken and hence has nothing to do with the structure of the present invention.

As also apparent from the views shown in FIGS. 15A to 15C, particularly characteristic point in the structure of this embodiment is that, because the interlayer insulating film 318 can completely insulate and separate the end portion of the first transparent conductive film 313 from the pixel electrode 320 within the contact hole, the film thickness of the insulating film 315 for capacitance may be reduced down to as thin as 10 to 200 nm (preferably 50 to 100 nm).

Accordingly, the proportion of an area for forming the capacitance is large and it is possible to form the storage capacitance of which the film thickness of the dielectric material is thin, thereby ensuring an enough capacitance even with not so high relative permittivity. This means that freedom degree for optionable raw materials are largely increased.

As a result, this makes it possible to select a raw material giving priority to characteristic of high transmittance, and it is also possible to realize high transmittance by means of reflection prevention effect obtained by combining properly the film thickness of the transparent conductive films and of the insulating film for capacitance. In point of that, a conventional structure has a certain degree of limitation on raw materials for and film thickness of the dielectric material, and therefore such freedom degree is small.

Figure 16:
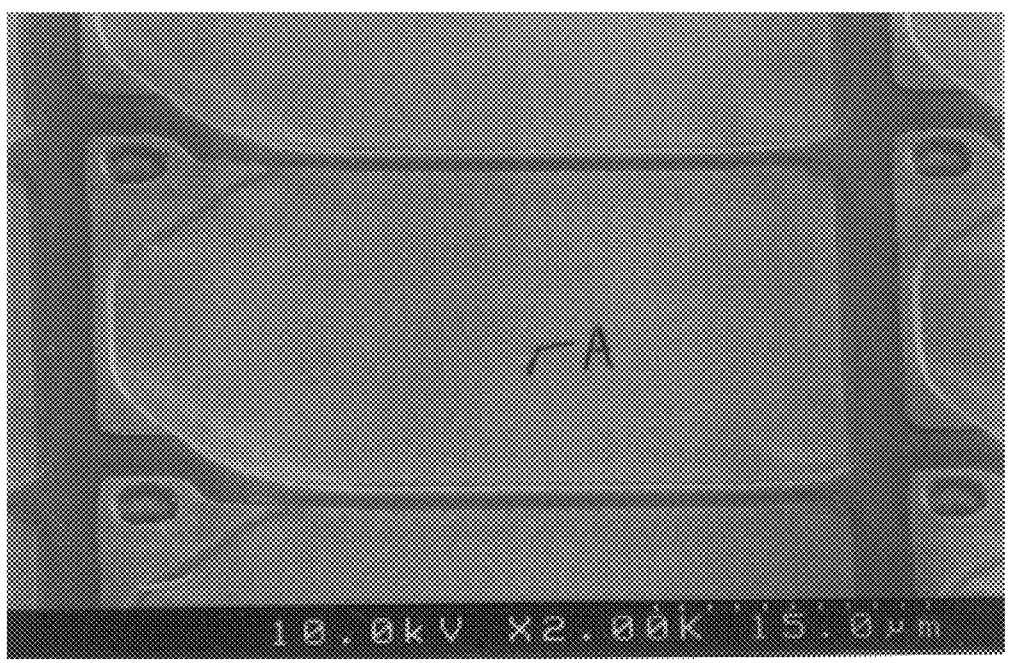
FIG. 16 is a photograph of TEM observation showing the surface of Embodiment 1.

Shown in FIG. 4D is a state in which, of two substrates, one having a TFT formed thereon (active matrix substrate) is nearly completed. An SEM photograph obtained by observing the top surface of an actual active matrix substrate (pixel portion) in this state is shown in FIG. 16. In FIG. 16, a region appeared as a hollow (denoted by A in FIG. 16) becomes the storage capacitance. Actually, there is a step of forming an orientated layer so as to cover the pixel electrode.

Figure 6:
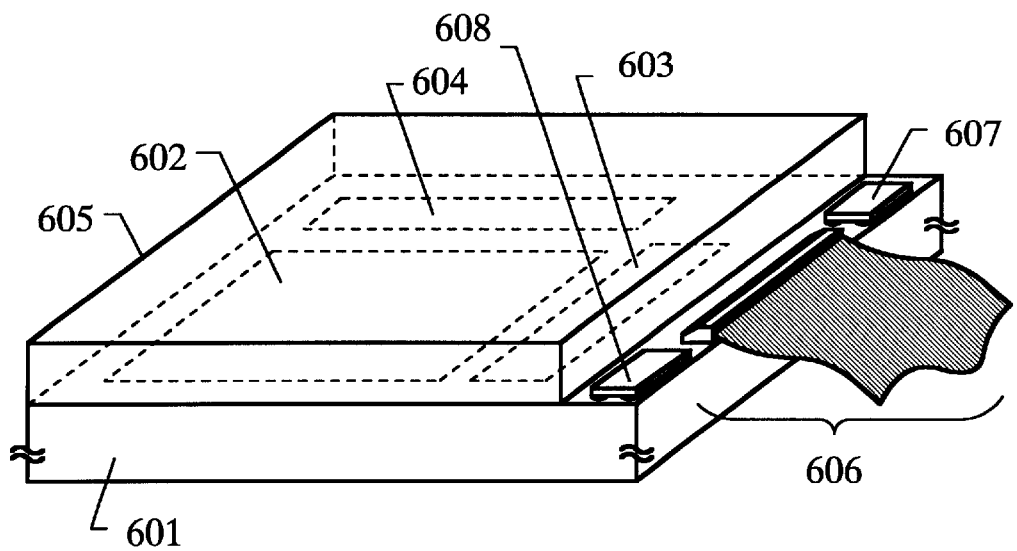
FIG. 6 is a view showing an outer appearance of an active matrix type liquid crystal display device of Embodiment 1.

An opposite substrate provided with an opposite electrode and an orientated layer is prepared and a liquid crystal material is sealed between the active matrix substrate and the opposite substrate, thereby completing an active matrix type liquid crystal display device which has the structure shown in FIG. 6. A well known cell-assembling step will do as the step of sealing the liquid crystal material, and therefore detailed description is omitted.

In FIG. 6, reference numeral 601 denotes the substrate having an insulating surface; 602, a pixel matrix circuit; 603, a source driver circuit; 604, a gate driver circuit; 605, an opposite substrate; 606, an FPC. (flexible print circuit); 607 and 608, external IC chips.

The IC chips 607 and 608 are attached if the need arises, and, depending on the situation, a circuit having a function equal to the IC chip, instead of the IC chip, may be formed integrally with the source driver circuit, gate driver circuit and the like over the same substrate. In other words, a signal processing circuit such as a D/A converter or γ correction circuit may be composed of the TFT.

In this embodiment, the invention is described with an example of a liquid crystal display device. Needless to say, however, the present invention may be applied to any EL (electroluminescence) display device or EC (electrochromic) display device on condition that it is a display device of active matrix type.

[Embodiment 2]

In this embodiment, in the structure shown in FIG. 1, a resin material having light shielding property (representatively a black resin material) is used as the insulating film 107, which is utilized as a black mask. The structure of this embodiment is a modified one of FIG. 1, in which merely a raw material for the insulating film 107 shown in FIG. 1 is changed, and the structure shown in this embodiment is readily realized by following the manufacturing process shown in Embodiment 1.

In this embodiment, a resin material in which black pigment, a metal material (titanium, chromium or the like) or a carbon-based material (such as graphite) is dispersed may be used as a black resin material. However, to utilize it as a black mask, the material desirably has an OD value of 3 or more. This embodiment employs a resin material (with OD value of 3) in which graphite is dispersed.

The OD value is the index representing light shielding property of a thin film, and is expressed with $OD=-Log_{10}T$ (T represents transmittance: substitute 0.001 for T when the transmittance is 0.1%). In other words, as the absolute value of the OD value becomes larger, the transmittance is enhanced.

Thus using a black resin material makes it possible to cover the TFT with a black interlayer insulating film so that the film unchanged is utilized as the black mask. That is, the process may be simplified by utilizing the technique of this embodiment.

[Embodiment 3]

In this embodiment, the structure in which a transparent resin material such as acryl or polyimide, and a black resin material, described in Embodiment 2, are laminated is employed instead of the interlayer insulating film 107 of FIG. 1. Incidentally, the structure of this embodiment also, as in Embodiment 2, may be readily realized by following the manufacturing process of Embodiment 1.

[Embodiment 4]

In this embodiment, description will be made on a pixel structure in an active matrix type liquid crystal display device manufactured by using the present invention. The top view of the pixel structure of this embodiment is shown in FIGS. 5A to 5C.

Figure 5A:
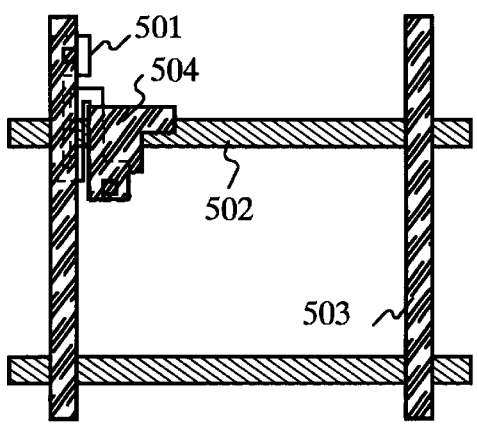
FIGS. 5A to 5C are top views each showing a pixel structure of Embodiment 4.

In FIG. 5A, reference numeral 501 denotes an active layer; 502, a gate wiring (of which a portion overlapping with the active layer 501 is particularly called an gate electrode); 503, a source wiring (of which a portion overlapping with the active layer 501 is particularly called a source electrode); and 504, a drain electrode. FIG. 5A corresponds to the top view of the pixel in the state of FIG. 3C. in Embodiment 1.

Figure 5B:
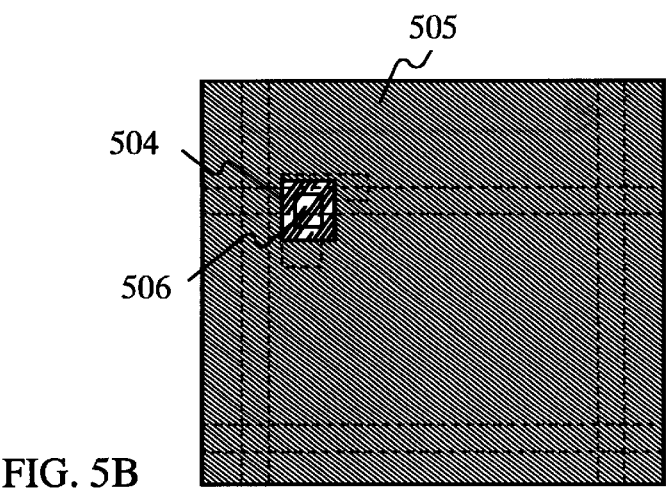
Figure 5C:
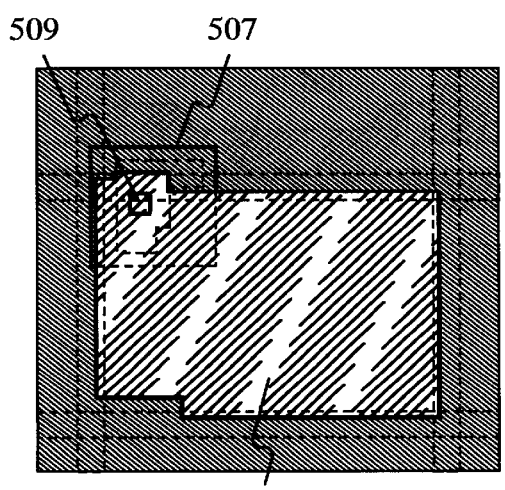

Next, FIG. 5B shows the correspondent to the top view of the pixel in the state of FIG. 4A in Embodiment 1. In FIG. 5B, reference numeral 505 denotes a first transparent conductive film and 506 denotes an opening portion. Below the opening portion 506 provided in the first transparent conductive film 505, there exists a drain electrode 504.

Subsequently, FIG. 5C. shows the correspondent to the top view of the pixel in the state of FIG. 4D in Embodiment 1. In FIG. 5C, reference numeral 507 denotes an interlayer insulating film that corresponds to the interlayer insulating film 318 of FIG. 4C. Reference numeral 508 denotes a pixel electrode and 509 denotes a contact hole (that corresponds to the contact hole 319 of FIG. 4C). The pixel electrode 508 is formed so that the edges thereof overlap with the gate wiring 502 and source wiring 503, thereby making inconspicuous on the screen the affect of the electric field disturbance generated at the edge portions.

The pixel structure shown in this embodiment is one embodiment mode when carrying out the present invention, and the present invention is not limited to this structure. However, with employment of the structure of this embodiment, almost the entire pixel region functions as the storage capacitance to sufficiently ensure the storage capacitance even in a liquid crystal display device having a pixel structure of high definition.

[Embodiment 5]

In this embodiment, description will be made, with reference to FIG. 7, on the structure for fixing to a common electric potential (ground electric potential) the first transparent conductive film 104 that functions as a lower electrode of the storage capacitance 109 in the structure shown in FIG. 1.

Figure 7:
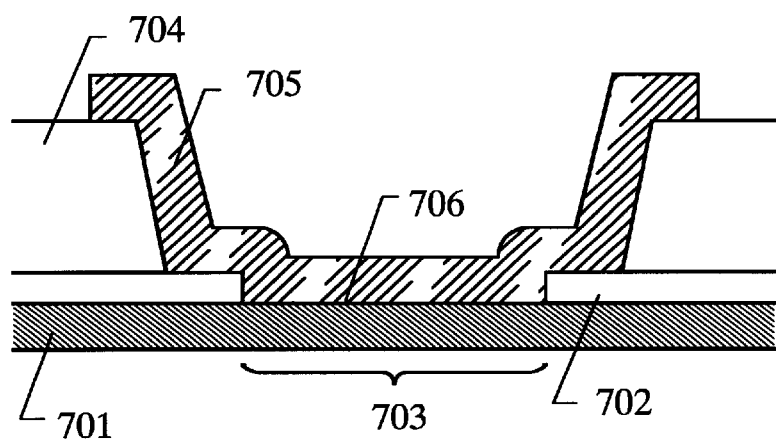
FIG. 7 is a sectional view showing the structure of a common contact portion of Embodiment 5.

FIG. 7 is an enlarged view showing the structure of a pad electrode for grounding which is provided outside an image display region (a panel portion) of a liquid crystal display device. On a first transparent conductive film 701, an insulating film 702 for capacitance having an opening portion 703 is formed. This opening portion 703 is formed simultaneously with a step corresponding to FIG. 4A shown in Embodiment 1.

Reference numeral 704 denotes an interlayer insulating film made of a resin material, on which a pad electrode 705 used as a pad for common contact is formed of a second transparent conductive film (the same raw material with which the pixel electrode is formed). This pad electrode 705 is formed simultaneously with a step corresponding to FIG. 4D shown in Embodiment 1.

In this embodiment, the first transparent conductive film 701 and the pad electrode 705 have the same electric potential when they come in contact with each other on a contact surface 706. Then through the grounding of the pad electrode 705, the first transparent conductive film 701 is fixed to the ground electric potential.

This pad for common contact can be adapted to function also as a pad for fixing an opposite electrode to the ground electric potential. A paste material mixed with conductive granules is formed on the pad electrode 705 and, keeping the state, an active matrix substrate and an opposite substrate are bonded to obtain conduction between the opposite electrode provided on the opposite substrate and the pad electrode, so that both the electrodes may be fixed to the ground electric potential.

In this way, to utilize the transparent conductive film formed, as the pad electrode 705, on the same layer on which pixel electrode is formed is effective in considerably simplifying the process.

Incidentally, the structure of this embodiment may be combined with any structure of Embodiments 1 to 4.

[Embodiment 6]

In this embodiment, description will be made, with reference to FIG. 8, on an example where a step of removing a flattening film on a drain electrode of a pixel TFT is added.

First, the state of FIG. 4A is obtained by following the process of Embodiment 1. Dry etching by oxygen plasma is then performed under the state of FIG. 4A. At this time, a part of the flattening film 312 made of a resin material is removed using as a mask the insulating film 315 for capacitance formed in a pattern.

Figure 8A:
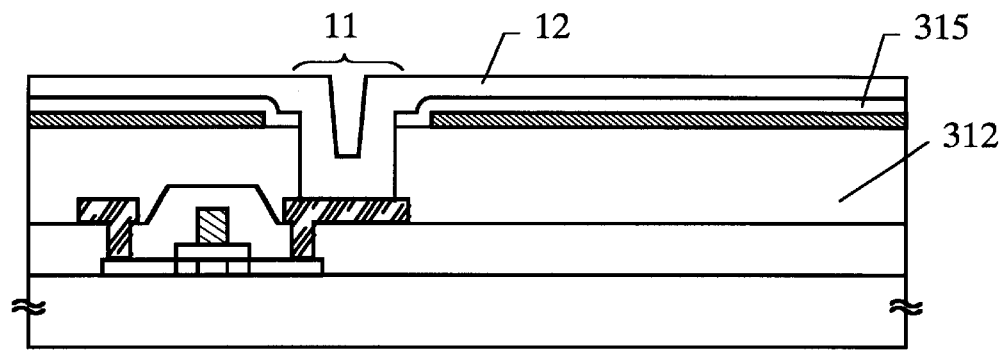
FIGS. 8A to 8C are views showing manufacturing steps of a pixel structure of Embodiment 6.

FIG. 8A shows a state in which, after a drop-in portion 11 is formed through the dry etching method, an interlayer insulating film 12 made of a resin material (polyimide, in this embodiment) is formed. Width of the opening portion in the drop-in portion 11 is substantially the same as the width of the second opening portion 316 shown in FIG. 4A.

Figure 8B:
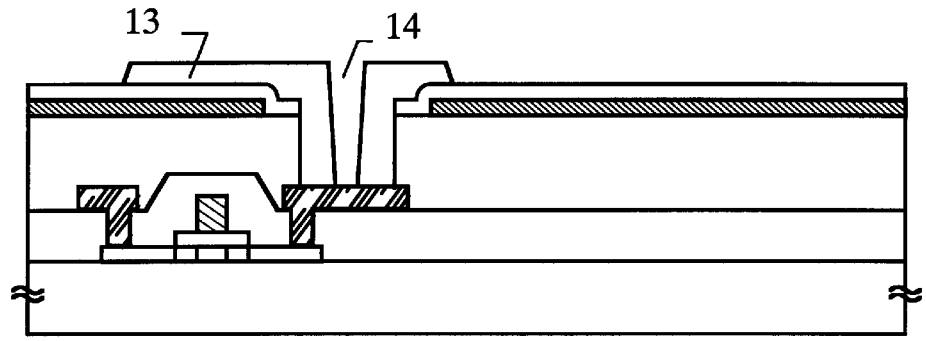
Figure 8C:
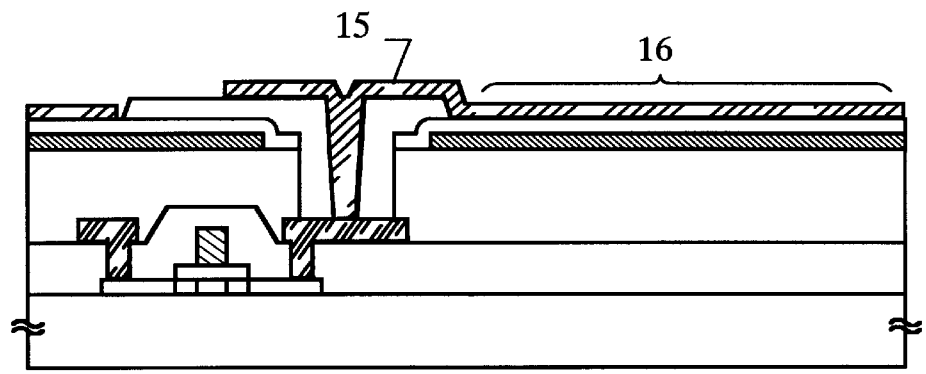

The interlayer insulating film 12 is then patterned to form an interlayer insulating film 13 formed in a pattern, and at the same time is formed a contact hole 14 for connecting a pixel electrode and a TFT. (FIG. 8B)

When the contact hole 14 is thus formed, a second transparent conductive film is formed and patterned to form a pixel electrode 15 connecting to the TFT. At this time, a storage capacitance 16 also is simultaneously formed. Further at the same time, the pad structure for grounding shown in Embodiment 5 may be formed.

Employment of the structure of this embodiment has an advantage in that the contact hole 14 can be formed simply by etching the interlayer insulating film made of the same raw material as the hole 14.

[Embodiment 7]

This embodiment shows, as in Embodiment 1, a process of manufacturing an active matrix type liquid crystal display device. This embodiment is a modification example of Embodiments 2 and 3. In Embodiments 2 and 3, the pixel TFT is shielded against light by the flattening film that uses a black resin. However, this embodiment takes up an example in which a black mask is formed on the active matrix substrate side to shield the pixel TFT against light.

This embodiment is described with reference to FIGS. 9A to 9D and 10A to 10C. Though in this embodiment also, description is given centering on one pixel of a pixel matrix circuit, it is needless to say that a driver circuit and a signal processing circuit may also be integrally formed on the same substrate.

Figure 9A:
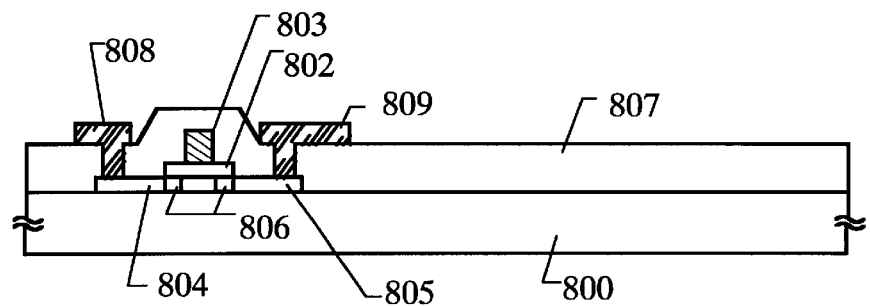
FIGS. 9A to 9D are views showing manufacturing steps of a pixel structure of Embodiment 7.
Figure 9B:
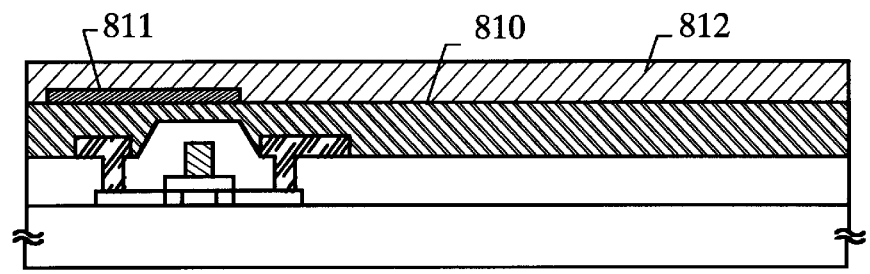

A glass substrate on the surface of which a base film made of silicon oxide is prepared as a substrate 800 having an insulating surface to obtain the structure of FIG. 3C by following the process in Embodiment 1, which is shown in FIG. 9A.

As shown in FIG. 9A, the following is layered on the surface of the substrate 800 in the order stated: an active layer formed of a semiconductor thin film; a gate insulating film 802 made of a silicon oxide film; a gate wiring 803 comprising two layers of tantalum/titanium. In the active layer, a source region 804, a drain region 805 and LDD regions 806 are formed. An interlayer insulating film 807 is formed on the entire substrate so as to cover the gate wiring 803. Formed as the interlayer insulating film 807 is a lamination film in which a silicon nitride film with a thickness of 25 nm and an acrylic resin film with a thickness of 900 nm are laminated.

A contact hole is formed with respect to the interlayer insulating film 807, and a source wiring 808 and a drain electrode 809 which respectively comprise the three-layer structure of titanium/aluminum/titanium are formed. Thus, the pixel TFT shown in FIG. 9A is completed.

Next, a flattening film 810 is formed so as to cover the pixel TFT. As the flattening film 810 in this embodiment, an acrylic resin is formed into a film with a coating method. The thickness of the acrylic resin is 0.7 μm at the thickest portion.

A titanium film 200 nm in thickness is then formed by the sputtering method, and is patterned with a chlorine-based gas by the dry etching method to form a black mask 811 made of titanium. An acrylic resin is coated as a flattening film 812 on the entire substrate by the coating method. The thickness of this acrylic resin is 0.5 μm at the thickest portion. The black mask 811 is a pixel matrix circuit that is integrally formed, and is connected to a common electric potential. (FIG. 9B) An ITO (indium tin oxide) film having a thickness of 115 nm is subsequently formed as a first transparent conductive film 813 through the sputtering method. The first transparent conductive film 813 constitutes an electrode of a storage capacitance. Conditions for forming the ITO film is such that ITO is used as a target, a mixture gas of argon and oxygen is used as a sputtering gas, film formation pressure is set to $3\times10^{-3}$ torr, DC current control of 1.5 A is performed and the substrate temperature is set to the room temperature.

Figure 9C:
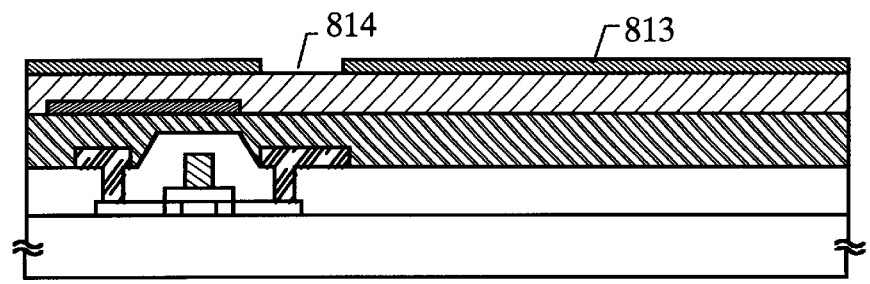
Figure 9D:
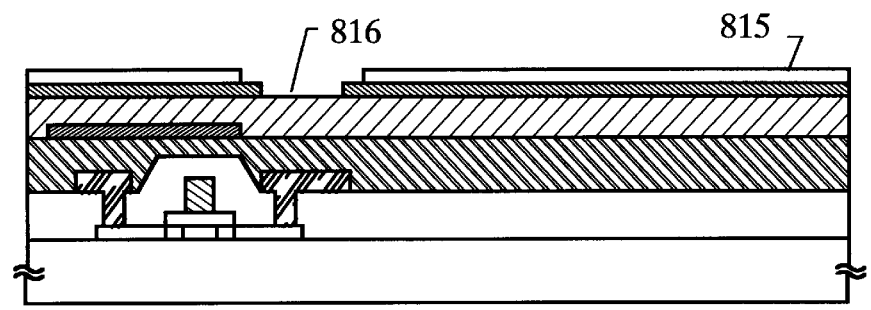

A first opening portion 814 is formed, above the drain electrode 809, in the first transparent conductive film 813 by wet etching using an etchant exclusive to ITO. (FIG. 9C)

On the first transparent conductive film 813, a silicon oxide film with a thickness of 150 nm is formed as an insulating film 815 for capacitance by the sputtering method. The silicon oxide film is formed under the condition that the film formation pressure is set to 3×10$^{-3}$ torr using as a target SiO$_2$, and as sputtering gas the mixed gas of argon (30 sccm) and oxygen (10 sccm). The film formation is performed with RF power source control of 2000 W and the substrate temperature is adjusted to be a room temperature.

Figure 10A:
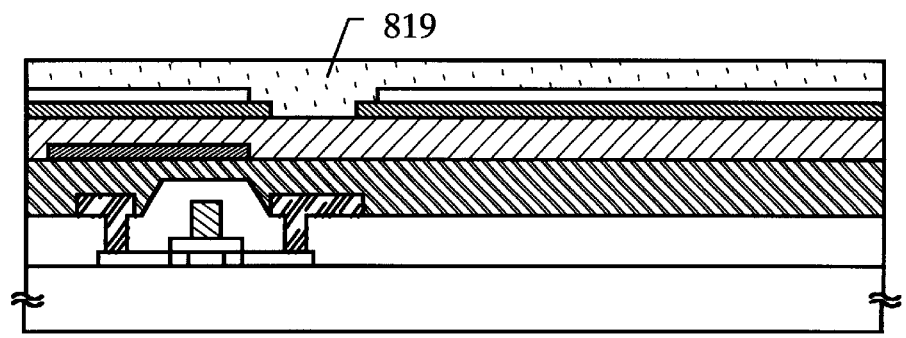
FIGS. 10A to 10C are views showing manufacturing steps of a pixel structure of Embodiment 7.
Figure 10B:
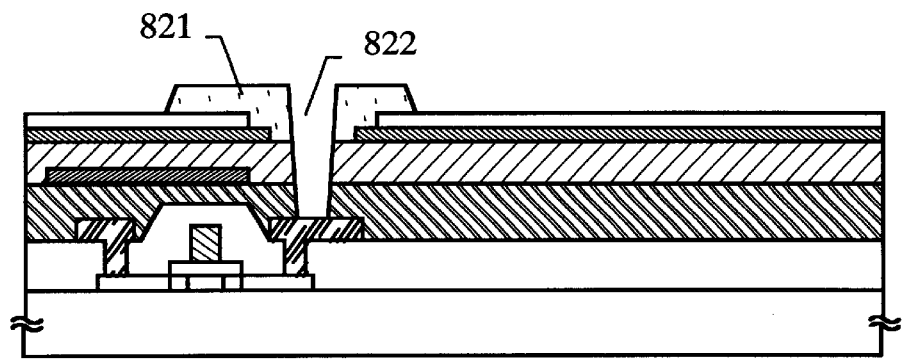
Figure 10C:
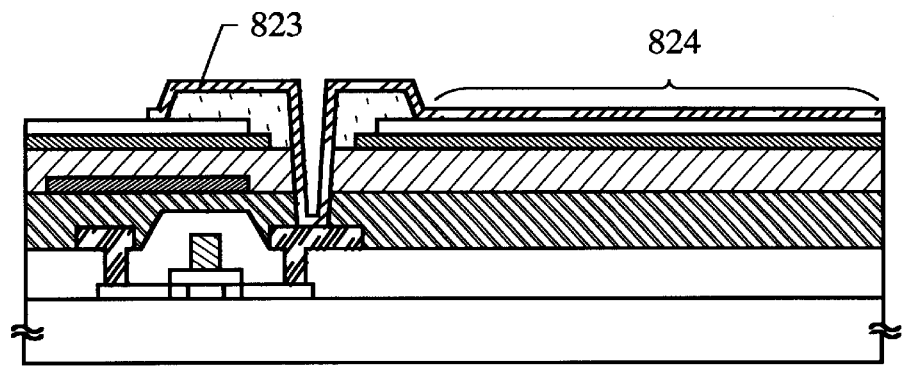

The insulating film 815 for capacitance made of silicon oxide is etched with buffered fluoric acid to form a second opening portion 816. The second opening portion 816 has a diameter smaller than that of the first opening portion 814, and is formed inside the first opening portion 814. The diameter of the second opening portion 816 here includes the margin of 3 μm plus the value of the diameter of the contact hole. (FIG. 9D) Next, an interlayer insulating film 819 is formed to cover the insulating film 815 for capacitance and the second opening portion 816. As the interlayer insulating film 819, an acrylic resin is formed into a film with a coating method. The thickness of the acrylic resin is 0.5 μm at the thickest portion. (FIG. 10A)

A contact hole 822 is then formed in the interlayer insulating film 819 made of acrylic resin and the flattening films 810 and 812, and at the same time, a part of the interlayer insulating film 819, on which the storage capacitance is to be formed is removed.

In this step, using a photoresist mask and O$_2$/CF$_4$ gas, the interlayer insulating film 819 made of acrylic resin is etched to form an interlayer insulating film 821 formed into a pattern, and utilizing the same photoresist mask as it is, the flattening films 812 and 810 are subsequently dry-etched with O$_2$/CF$_4$ gas to form the contact hole 822. If, at this time, a condition for forming a tapered portion on a side wall of the contact hole 822 is fulfilled, stepped cut of the pixel electrode may be prevented.

Then, an ITO film with a thickness of 120 nm is formed as a second transparent conductive film by the sputtering method. The second transparent conductive film constitutes an electrode of the storage capacitance as well as the pixel electrode. The ITO film is etched by the etchant exclusive to ITO to form a pixel electrode 823. On a portion where this pixel electrode 823 comes in contact with the insulating film 815 for capacitance, a storage capacitance 824 is formed by the insulating film 815 for capacitance that is sandwiched between a pair of transparent conductive films (the first transparent conductive film and the second transparent conductive film).

In this embodiment also, the second opening portion 816 is covered with the interlayer insulating film 821 formed into a pattern, which makes it possible to prevent short circuit between the pixel electrode 823 and the end face of the first transparent conductive film 813.

For instance, a case is assumed that, in the structure of Embodiment 1, a combination of an acrylic resin film as the flattening film 312 and a polyimide film as the interlayer insulating film 317. In this case, etching rate in acrylic resin is slightly faster, involving a possibility of forming a scooped portion under the first transparent conductive film 313 and hence involving the risk of causing poor coverage in the pixel electrode, i.e., wire disconnection defect.

In point of this, the structure of this embodiment is capable of forming the contact hole with nothing but the very same material so as not to cause any shape disorder in the contact hole brought by difference in etching rate, resulting that prevention of wire disconnection defect in the pixel electrode due to the scooped portion is made possible.

Incidentally, the structure of this embodiment may be combined with any structure of Embodiments 1 to 5. When combined with any of those structures, the same effect that wire disconnection defect in the pixel electrode caused depending on a shape of the contact hole is prevented may be obtained.

[Embodiment 8]

This embodiment also, as in Embodiment 7, is an example in which a black mask is formed on the active matrix substrate side to shield a pixel TFT against light. This embodiment is explained using FIGS. 11A to 11E and 12A to 12D.

A glass substrate provided on its surface with a base film that is formed of a silicon oxide film is prepared as a substrate 900 having an insulating surface. Then following the process of Embodiment 1, the structure of FIG. 3C. is obtained, which is shown in FIG. 11A.

Figure 11A:
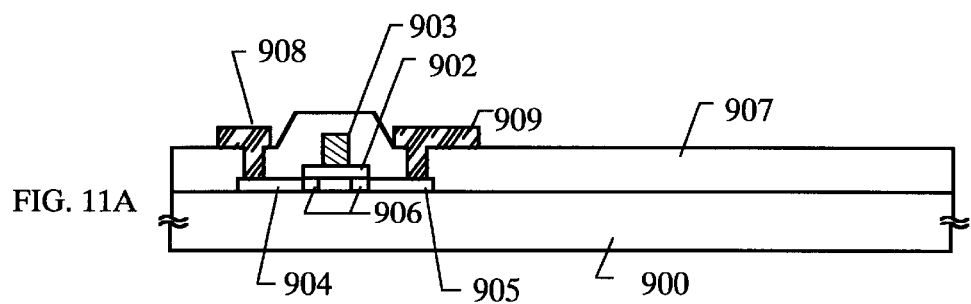
FIGS. 11A to 11E are views showing manufacturing steps of a pixel structure of Embodiment 8.

As shown in FIG. 11A, layered, in the order stated, on the surface of the substrate 900 are: an active layer made of a semiconductor thin film; a gate insulating film 902 made of a silicon oxide film; and a gate wiring 903 comprising a two-layer film of tantalum/titanium. The active layer has a source region 904, a drain region 905 and LDD regions 906 which are formed therein. An interlayer insulating film 907 is formed on the entire substrate to cover the gate wiring 903. As the interlayer insulating film 907, a lamination film comprising a silicon nitride film with a thickness of 25 nm and an acrylic resin film with a thickness of 900 nm is formed.

A contact hole is formed with respect to the interlayer insulating film 907 to form a source wiring 908 and a drain electrode 909 which have three-layer structure of titanium/aluminum/titanium. A pixel TFT shown in FIG. 11A is thus completed.

Figure 11B:
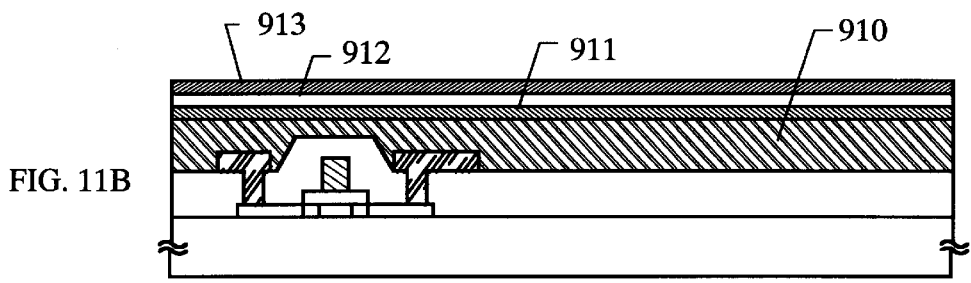

Subsequently, the pixel TFT is covered with a flattening film 910 made of an acrylic resin film. The acrylic resin film is formed by the coating method so as to have a thickness of 1.2 μm at the thickest portion. Then, through the sputtering method, a first transparent conductive film 911 made of ITO with a thickness of 115 nm, an insulating film 912 for capacitance made of silicon oxide with a thickness of 150 nm and a metal film 913 for black mask made of a titanium film with a thickness of 200 nm are formed in layer on the surface of the flattening film 910. (FIG. 11B)

Figure 11C:
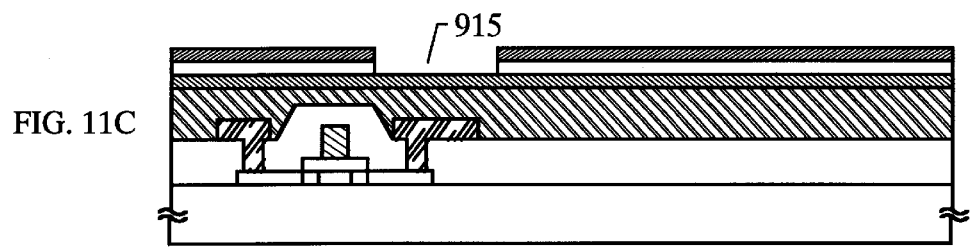

A not-shown photoresist mask is next formed, and dry etching is performed on the metal film 913 for black mask made of titanium and the insulating film 912 for capacitance made of silicon oxide to form a first opening portion 915 above the drain electrode 909. A chlorine-based gas is used as an etching gas for the titanium film, and a fluorine-based gas such as CHF$_3$ is used as an etching gas for the silicon oxide film. The forming step of this first opening portion is performed with, in preference to wet etching, dry etching of anisotropic. (FIG. 11C)

Figure 11D:
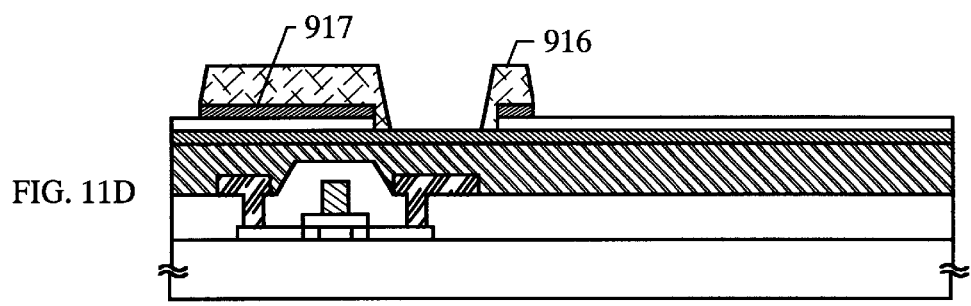
Figure 11E:
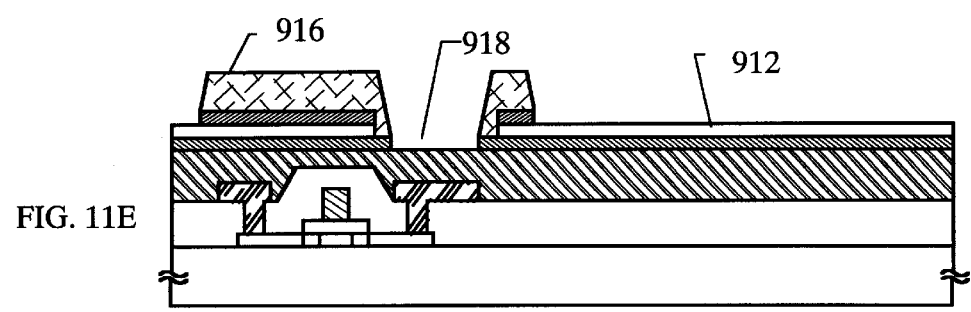

After releasing the photoresist mask for the first opening portion, again, a photoresist mask 916 is formed. The metal film 913 for black mask of the storage capacitance is removed through dry etching to form a black mask 917 made of titanium. With the use of a chlorine-based gas in etching of the metal film 913, the insulating film 912 for capacitance formed of oxide silicon can function as an etching stopper. The black mask 917 is a pixel matrix circuit that is integrally formed, and is connected to a common electric potential. (FIG. 11D)

Figure 12A:
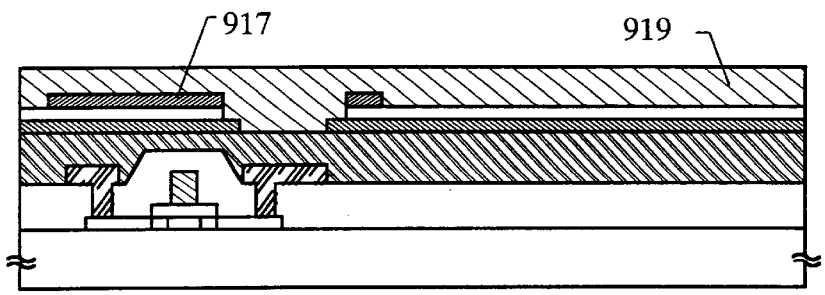
FIGS. 12A to 12D are views showing manufacturing steps of a pixel structure of Embodiment 8.

Further, using the same photoresist mask 916, the first transparent conductive film 911 is etched with the etchant exclusive to ITO to form a second opening portion 918. The second opening portion 918 has a diameter smaller than that of the first opening portion 915, and is formed inside the first opening portion 915. The second opening portion 918 is formed making allowances for the margin of 3 μm. (FIG. 11E) After releasing the photoresist mask 916, an interlayer insulating film 919 is formed on the entire substrate so as to cover the black mask 917, the insulating film 912 for capacitance and the second opening portion 918. An acrylic resin film is formed as the interlayer insulating film 919 by the coating method. The thickness of the acrylic resin film is 0.5 μm at the thickest portion. (FIG. 12A)

Then, a not-shown photoresist mask is formed, and the interlayer insulating film 919 made of acrylic resin is dry-etched with $O_2/CF_4$ gas to form an interlayer insulating film 920 formed in a pattern. Dry etching with $O_2/CF_4$ gas is continued to etch the flattening film 910 made of acrylic resin, thereby forming a contact hole 921. If, at this time, a condition for forming a tapered portion on a side wall of the contact hole 921 is fulfilled, stepped cut of the pixel electrode may be prevented. (FIG. 12B)

An ITO film with a thickness of 120 nm is then formed as a second transparent conductive film by the sputtering method, and patterned to form a pixel electrode 923. At a portion where this pixel electrode 923 is brought into contact with the insulating film 912 for capacitance, a storage capacitance 924 is formed by the insulating film 912 for capacitance that is sandwiched between a pair of transparent conductive films (the first transparent conductive film 911 and a pixel electrode 923). (FIG. 12C)

In this embodiment also, the second opening portion 918 is covered with the interlayer insulating film 920 formed into a pattern, which makes it possible to prevent short circuit between the pixel electrode 923 and the end face of the first transparent conductive film 911.

Figure 12B:
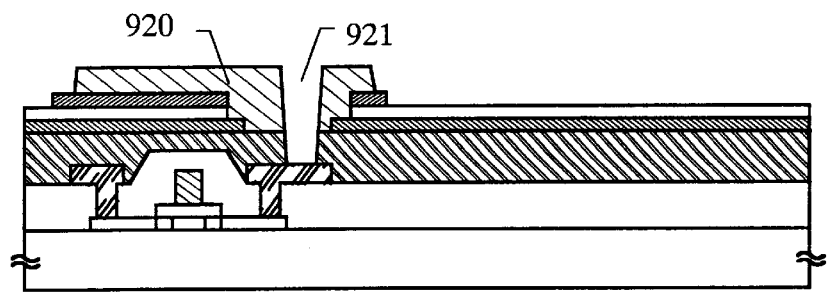
Figure 12C:
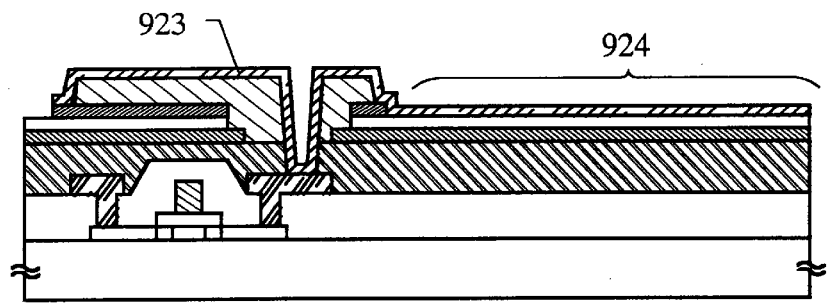

Here in the step shown in FIG. 12B, the interlayer insulating film 920 is formed in a pattern so as not to cover the whole black mask (also called as black matrix) 917, thereby connecting the pixel electrode 923 to the black mask 917. Thus the electric potential of the pixel TFT when it is in the off state is connected to the common electric potential.

Figure 12D:
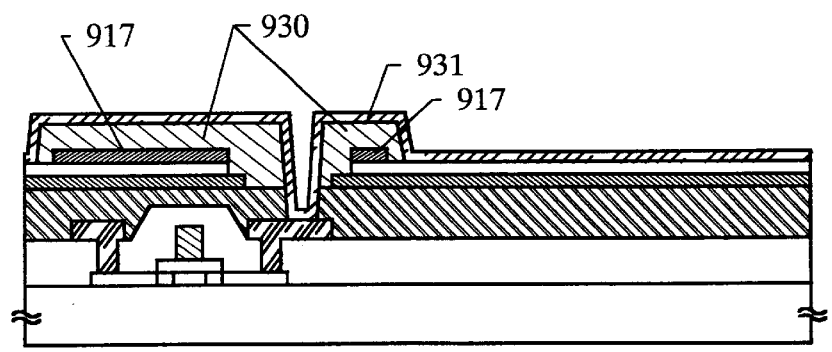

Alternatively, in the step shown in FIG. 12B, the interlayer insulating film 919 may be patterned as illustrated in FIG. 12D to form an interlayer insulating film 930 formed in a pattern. In other words, such a structure may be adopted that a pixel electrode 931 is not connected to the black mask 917 by covering the whole black mask 917 with the interlayer insulating film 930 formed in a pattern.

[Embodiment 9]

An electro-optical device of the present invention having any structure in Embodiments 1 through 8 may be used as various electro-optical devices (including an active matrix type liquid crystal display device, an active matrix type EL display and an active matrix type EC display). Namely, the present invention may be embodied in every electronic apparatus incorporating therein one of those electro-optical devices as a display medium.

Figure 13A:
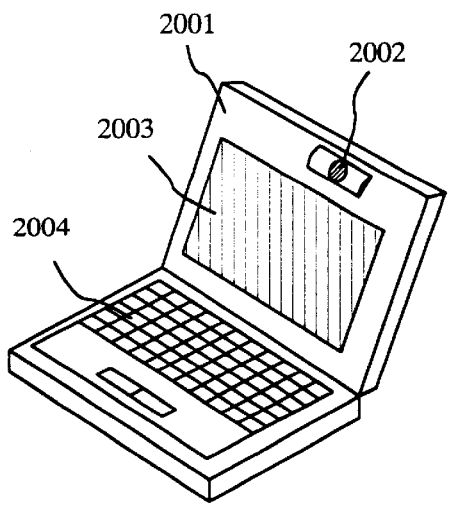
FIGS. 13A to 13F are views each showing an example of an electronic apparatus of Embodiment 9.

Apparatuses that may be enumerated as such an electronic apparatus are video cameras, digital cameras, projectors (rear type projectors or front type projectors), head mount displays (goggle type displays), vehicle navigation systems, personal computers and portable information terminals (such as mobile computers, cellular phones and electronic books). Examples of those are shown in FIGS. 13A to 13F and 14A to 14D. FIG. 13A shows a personal computer consisted of a main body 2001, an image input unit 2002, a display device 2003 and a keyboard 2004. The present invention can be applied to the image input unit 2002, the display device 2003 and other signal controlling circuits.

Figure 13B:
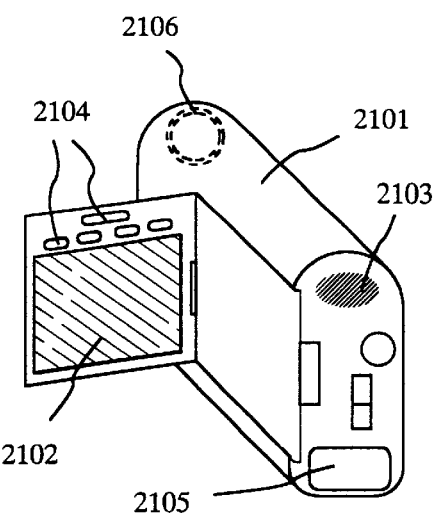

FIG. 13B shows a video camera consisted of a main body 2101, a display device 2102, a voice input unit 2103, an operation switch 2104, a battery 2105 and an image receiving unit 2106. The present invention can be applied to the display device 2102, the voice input unit 2103 and other signal controlling circuits.

Figure 13C:
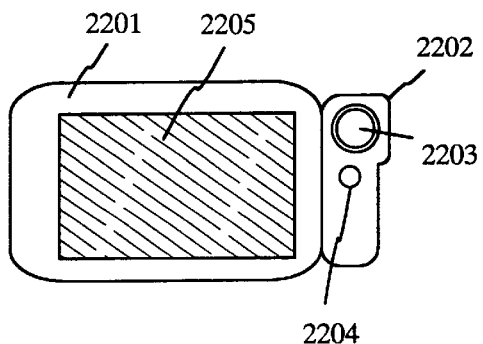

FIG. 13C. shows a mobile computer consisted of a main body 2201, a camera unit 2202, an image receiving unit 2203, an operation switch 2204 and a display device 2205. The present invention can be applied to the display device 2205 and other signal controlling circuits.

Figure 13D:
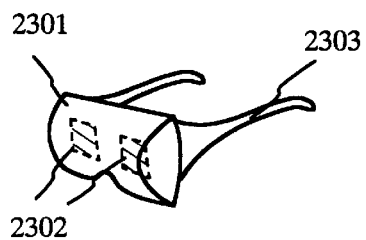

FIG. 13D shows a goggle type display consisted of a main body 2301, a display device 2302 and an arm potion 2303. The present invention can be applied to the display device 2302 and other signal controlling circuits.

Figure 13E:
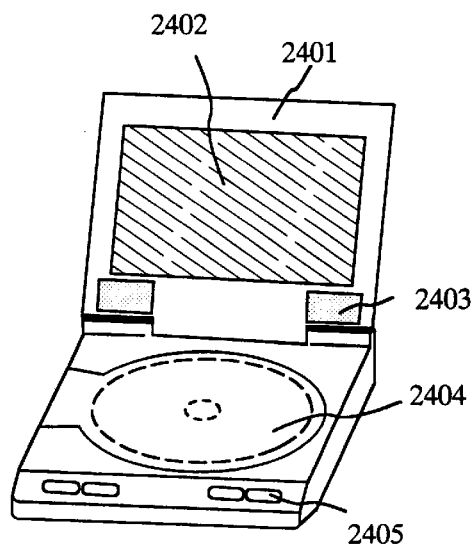

FIG. 13E shows a player that uses a recording medium storing a program (hereinafter, referred to as a recording medium) and is consisted of a main body 2401, a display device 2402, a speaker unit 2403, a recording medium 2404 and an operation switch 2405. This device uses as the recording medium a DVD (digital versatile disc), a CD, etc., to provide measures for the appreciation of music or movies, playing a video game and connecting to the Internet. The present invention can be applied to the display device 2402 and other signal controlling circuits.

Figure 13F:
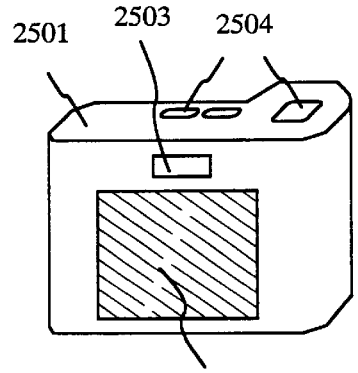

FIG. 13F shows a digital camera consisted of a main body 2501, a display device 2502, an eyepiece 2503, an operation switch 2504 and an image receiving unit (not shown). The present invention can be applied to the display device 2502 and other signal controlling circuits.

Figure 14A:
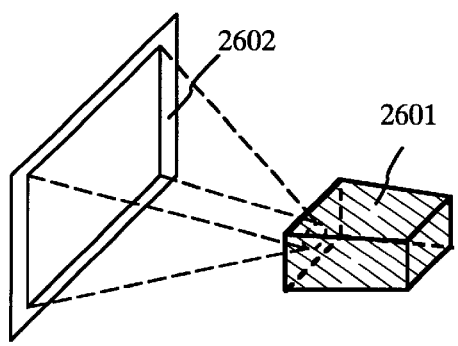
FIGS. 14A to 14D are views each showing an example of an electronic apparatus of Embodiment 9.

FIG. 14A shows a front type projector consisted of a display device 2601 and a screen 2602. The present invention can be applied to the display device and other signal controlling circuits.

Figure 14B:
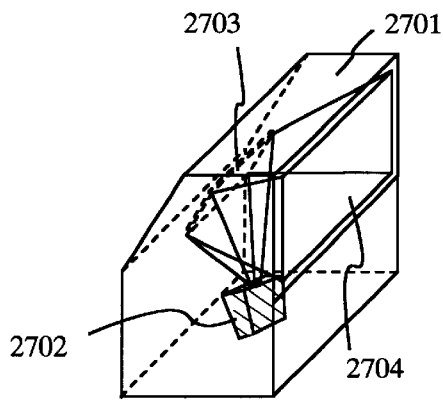

FIG. 14B shows a rear type projector consisted of a main body 2701, a display device 2702, a mirror 2703 and a screen 2704. The present invention can be applied to the display device and other signal controlling circuits.

Figure 14C:
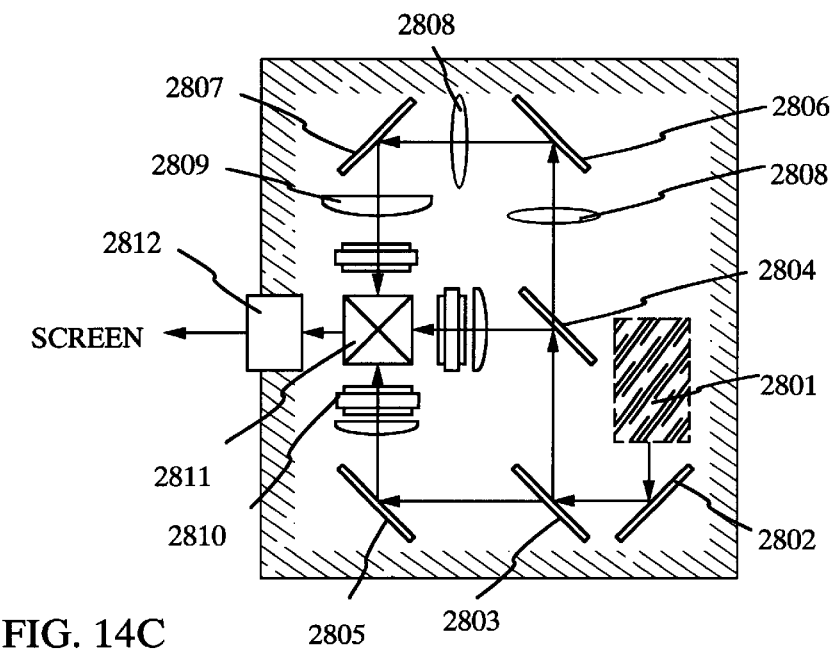

FIG. 14C. shows an example of the structure of the display device 2601, 2702 in FIGS. 14A, 14B. The display device 2601 or 2702 is consisted of a light source optical system 2801, mirrors 2802 and 2805 to 2807, dichroic mirrors 2803 and 2804, optical lenses 2808, 2809 and 2811, a liquid crystal display device 2810 and a projection optical system 2812. The projection optical system 2812 comprises an optical system that is provided with a projection lens. This embodiment shows an example of three-plate type which employs three liquid crystal display devices 2810, but the invention is not particularly limited and may be applied to, for instance, a single plate type projector. In addition, in the light path indicated by an arrow in FIG. 14C, an optical system such as an optical lens, a film having polarizing function, a film for adjusting the phase difference and an IR film may be provided at discretion of a person who carries out the invention.

Figure 14D:
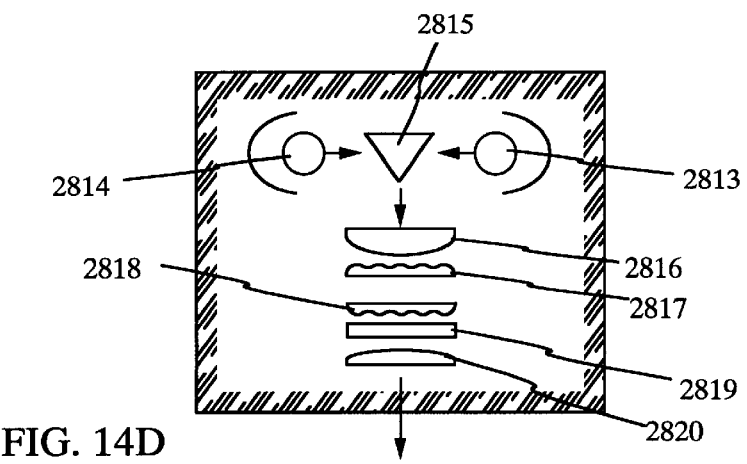

FIG. 14D shows an example of the structure of the light source optical system 2801 in FIG. 14C. In this embodiment, the light source optical system 2801 is consisted of light sources 2813 and 2814, a synthesizing prism 2815, collimator lenses 2816 and 2820, lens arrays 2817 and 2818 and a polarization converting element 2819. In the light source optical system shown in FIG. 14D, two light sources are used. However, the light source to be provided may be three to four or more, or of course one light source may be used. In addition, an optical lens, a film having polarizing function, a film for adjusting the phase difference and an IR film may be provided at discretion of a person who carries out the invention. The system may be applied also to a single plate type projector.

As described above, application range of the present invention is so wide that the invention is applicable to electronic apparatuses of every field. The electronic apparatuses of this embodiment may be realized with the structure constructed of any combination of Embodiments 1 through 8.

[Embodiment 10]

In the liquid crystal display devices manufactured in accordance with the above embodiments, various kinds of liquid crystal may be used other than TN liquid crystal. For example, usable liquid crystal includes ones disclosed in: 1998, SID, "Characteristics and Driving Scheme of Polymer-Stabilized Monostable FLCD Exhibiting Fast Response Time and High Contrast Ratio with Gray-Scale Capability" by H. Furue et al.; 1997, SID DIGEST, 841, "A Full-Color Thresholdless Antiferroelectric LCD Exhibiting Wide Viewing Angle with Fast Response Time" by T. Yoshida et al.; 1996, J. Mater. Chem. 6(4), 671–673, "Thresholdless Antiferroelectricity in Liquid Crystals and its Application to Displays" by S. Inui et al.; and U.S. Pat. No. 5,594,569.

Liquid crystal that exhibits antiferroelectric phase in a certain temperature range is called antiferroelectric liquid crystal. Among mixed liquid crystal having antiferroelectric liquid crystal, there is one called thresholdless antiferroelectric mixed liquid crystal, which exhibits electro-optical response characteristics that the transmittance varies continuously with respect to the electric field. Some of the thresholdless antiferroelectric mixed liquid crystal show electro-optical response characteristics of V shape, and there has been found among them ones the driving voltage of which is about ±2.5 V (cell thickness of about 1 $\mu$m to 2 $\mu$m).

Figure 17:
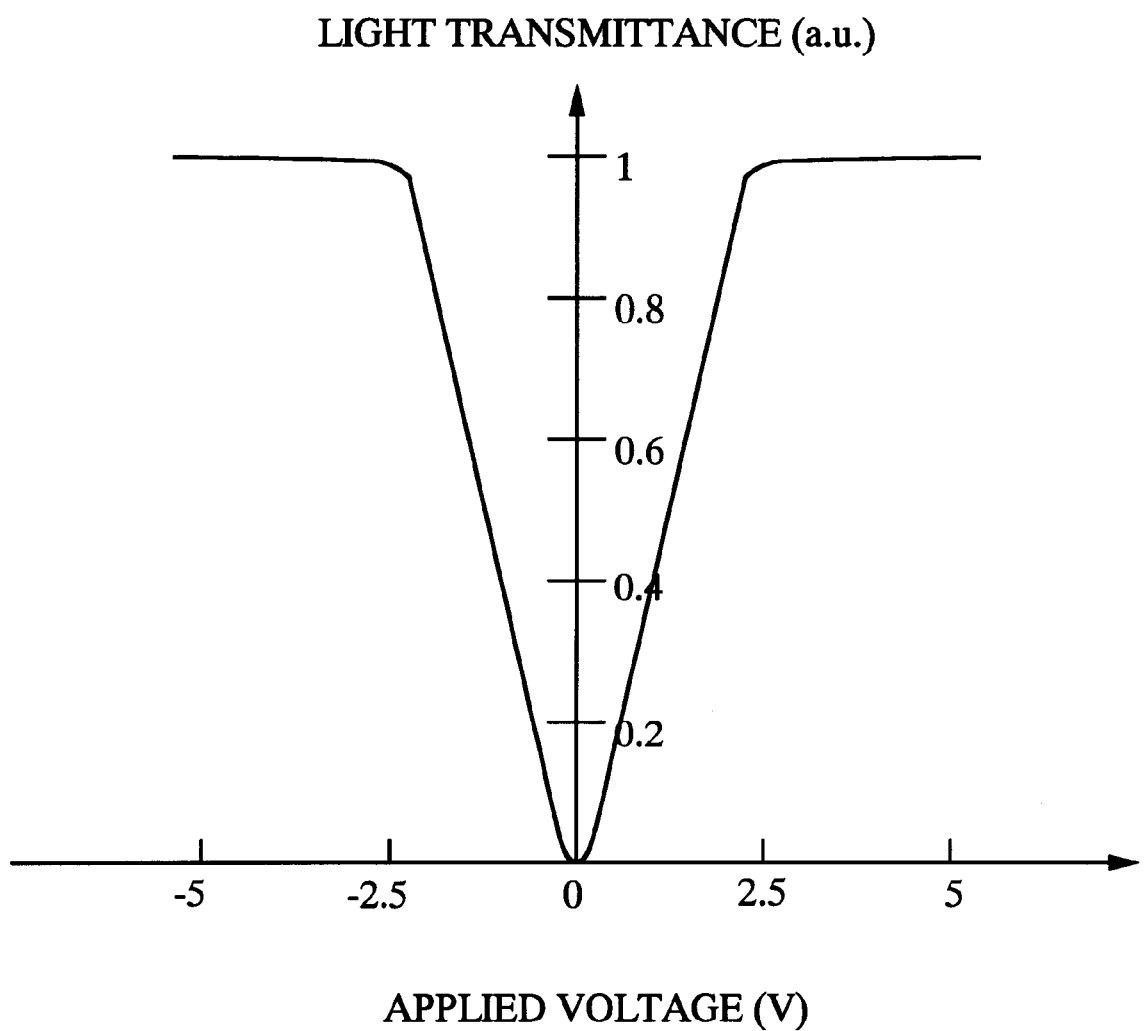
FIG. 17 is a graph showing characteristics of the thresholdress antiferroelectric mixed liquid crystal that exhibits electro-optical response characteristics of V shape, in terms of its light transmittance with respect to the applied voltage of Embodiment 10.

Here, reference is made to FIG. 17 showing characteristics of the thresholdless antiferroelectric mixed liquid crystal that exhibits electro-optical response characteristics of V shape, in terms of its light transmittance with respect to the applied voltage. In the graph shown in FIG. 17, the axis of the ordinate shows transmittance (arbitrary unit) and the axis of abscissa shows applied voltage. A transmission axis of a polarizing plate on the incident side of a liquid crystal display device is set substantially in parallel with the normal line direction of a smectic layer of the thresholdless antiferroelectric mixed liquid crystal which substantially coincides with the rubbing direction of the liquid crystal display device. On the other hand, a transmission axis of the polarizing plate on the emission side is set to be substantially perpendicular to the transmission axis of the polarizing plate on the incident side (cross Nicol).

As shown in FIG. 17, it can be understood that using such thresholdless antiferroelectric mixed liquid crystal makes possible the low-voltage driving and gradation display.

In the case that such thresholdless antiferroelectric mixed liquid crystal of low-voltage driving is used in a liquid crystal display device having an analog driver, supply voltage of a sampling circuit for a video signal may be suppressed to, for example, about 5V to 8V. Accordingly, operation supply voltage of the driver may be lowered to realize a liquid crystal display device of lowered power consumption and high reliability.

Also in the case that such thresholdless antiferroelectric mixed liquid crystal of low-voltage driving is used in a liquid crystal display device having a digital driver, output voltage of a D/A convertor circuit may be reduced so as to lower operation supply voltage of the D/A convertor circuit and to lower operation supply voltage of the driver. Accordingly, a liquid crystal display device of lowered power consumption and high reliability may be realized.

Therefore, the use of such thresholdless antiferroelectric mixed liquid crystal of low-voltage driving is effective also when employing a TFT having an LDD region (lightly doped region) of which width is relatively small (for example, 0 nm to 500 nm, or 0 nm to 200 nm).

In general, thresholdless antiferroelectric mixed liquid crystal is large in spontaneous polarization and dielectric permittivity of liquid crystal itself is high. For that reason, relatively large storage capacitance is required for a pixel when using for a liquid crystal display device the thresholdless antiferroelectric mixed liquid crystal. Thus, preferably used is thresholdless antiferroelectric mixed liquid crystal that is small in spontaneous polarization. Alternatively, with employment of the linear-sequential driving as a driving method of the liquid crystal display device, writing period of gradation voltage into a pixel (pixel feed period) is prolonged so that a small storage capacitance may be supplemented.

The use of such thresholdless antiferroelectric mixed liquid crystal realizes the low-voltage driving, to thereby realize a liquid crystal display device of lowered power consumption.

Incidentally, any liquid crystal may be used as a display medium for a liquid crystal display device of the present invention, on condition that it has electro-optical characteristics as shown in FIG. 17.

Carrying out the present invention makes it possible to freely set the film thickness of the insulating film for capacitance sandwiched between the transparent conductive films, which allows to use as the storage capacitance the whole area of the pixel without degrading the light transmittance within the pixel.

Therefore, ensuring a sufficient storage capacitance is made possible when intending to form an active matrix type liquid crystal display device which is small in the pixel area and has high definition. Also, sufficiently high light transmittance enables the device to brightly display an image even when the whole area within the pixel is the storage capacitance. That is, here realized an electro-optical device with high definition and quality, and an electronic apparatus provided with such an electro-optical device.

What is claimed is:

1. A semiconductor device comprising:
   a plurality of pixel TFTs being arranged in a matrix;
   a storage capacitance being connected to each of the plurality of pixel TFTs;
   a first transparent conductive film having a first opening portion;
   a capacitance insulating film covering the first transparent conductive film and having a second opening portion which is formed at an inside deeper than the first opening portion;
   an interlayer insulating film covering the second opening portion and being formed over the pixel TFTs; and
   a second transparent conductive film being formed in contact with the interlayer insulating film and the capacitance insulating film,
   wherein the storage capacitance comprises the first transparent conductive film, the capacitance insulating film and the second transparent conductive film.

2. A semiconductor device comprising:
   a plurality of pixel TFTs being arranged in a matrix; and
   a storage capacitance being connected to each of the plurality of pixel TFTs;
   a first transparent conductive film having a first opening portion;

a capacitance insulating film covering the first transparent conductive film and having a second opening portion which is formed at an inside deeper than the first opening portion;

an interlayer insulating film covering the second opening portion and being formed over the pixel TFTs;

a second transparent conductive film being formed in contact with the interlayer insulating film and the capacitance insulating film; and a pad electrode including the second transparent conductive film, wherein the storage capacitance comprising the first transparent conductive film, the capacitance insulating film and the second transparent conductive film, wherein the first transparent conductive film is grounded through the pad electrode.

3. A device according to claim 1, wherein the interlayer insulating film includes a resin material.

4. A device according to claim 1, wherein the interlayer insulating film comprises a resin material having a light shielding property or a lamination of a resin material having a light shielding property and a transparent resin material.

5. A device according to claim 2, wherein the interlayer insulating film includes a resin material.

6. A device according to claim 2, wherein the interlayer insulating film comprises a resin material having a light shielding property or a lamination of a resin material having a light shielding property and a transparent resin material.

7. A device according to claim 1, wherein the semiconductor device is one selected from the group consisting of a liquid crystal display device, an EL (electroluminescence) display device and an EC (elelctrochromic) display device.

8. A device according to claim 1, wherein the semiconductor device is one selected from the group consisting of a video camera, a digital camera, a rear type projector, a front type projector, a head mount display (a goggle type display), a vehicle navigation system, a personal computer and a portable information terminal such as a mobile computer, a cellular phone and an electronic book.

9. A device according to claim 2, wherein the semiconductor device is one selected from the group consisting of a liquid crystal display device, an EL (electroluminescence) display device and an EC (electrochromic) display device.

10. A device according to claim 2, wherein the semiconductor device is one selected from the group consisting of a video camera, a digital camera, a rear type projector, a front type projector, a head mount display (a goggle type display), a vehicle navigation system, a personal computer and a portable information terminal such as a mobile computer, a cellular phone and an electronic book.

* * * * *